(12) United States Patent
Yoshiura et al.

(10) Patent No.: US 10,425,028 B2
(45) Date of Patent: Sep. 24, 2019

(54) MOTOR CONTROL DEVICE AND METHOD OF CONTROLLING MOTOR

(71) Applicant: KABUSHIKI KAISHA YASKAWA DENKI, Kitakyushu-shi (JP)

(72) Inventors: Yasufumi Yoshiura, Kitakyushu (JP); Yasuhiko Kaku, Kitakyushu (JP); Shouta Kawahara, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/940,968

(22) Filed: Mar. 30, 2018

(65) Prior Publication Data

US 2019/0158006 A1 May 23, 2019

(30) Foreign Application Priority Data

Nov. 20, 2017 (JP) .................................. 2017-223204

(51) Int. Cl.
| | |
|---|---|
| H02P 7/00 | (2016.01) |
| H02P 21/14 | (2016.01) |
| H02P 29/40 | (2016.01) |
| H02P 21/22 | (2016.01) |
| H02P 25/06 | (2016.01) |

(Continued)

(52) U.S. Cl.
CPC ............ H02P 21/143 (2013.01); H02P 21/22 (2016.02); H02P 23/20 (2016.02); H02P 25/06 (2013.01); H02P 27/02 (2013.01); H02P 29/40 (2016.02); *H02P 6/34* (2016.02)

(58) Field of Classification Search
CPC .......... H02P 21/22; H02P 6/18; H02P 21/143; H02P 21/18; H02P 24/40; H02P 29/40
See application file for complete search history.

(56) References Cited

U.S. PATENT DOCUMENTS

2003/0102839 A1* 6/2003 Kinpara .................... H02P 6/14
318/700
2004/0174124 A1   9/2004 Lee
(Continued)

FOREIGN PATENT DOCUMENTS

| JP | 06-309008 | 11/1994 |
| JP | 2003-205484 | 7/2003 |

(Continued)

OTHER PUBLICATIONS

Japanese Office Action for corresponding JP Application No. 2017-223204, dated Aug. 28, 2018.

(Continued)

*Primary Examiner* — Karen Masih
(74) *Attorney, Agent, or Firm* — Mori & Ward, LLP

(57) ABSTRACT

A motor control device includes output command calculation circuitry and inertial load value calculation circuitry. The output command calculation circuitry is configured to calculate a motor output command, based on a motor acceleration command and an inertial load value indicative of a magnitude of inertia of a load on a motor. The inertial load value calculation circuitry is configured to calculate an estimated inertial load value with an adaptive observer, based on the motor output command and a motor actual output to be output from the motor, and configured to calculate the inertial load value, based on the estimated inertial load value.

17 Claims, 26 Drawing Sheets

(51) Int. Cl.
    *H02P 27/02*    (2016.01)
    *H02P 23/20*    (2016.01)
    *H02P 6/34*    (2016.01)

(56) References Cited

U.S. PATENT DOCUMENTS

| | | |
|---|---|---|
| 2005/0080511 A1 | 4/2005 | Takenaka et al. |
| 2014/0156144 A1 | 6/2014 | Hoshi et al. |
| 2017/0104431 A1* | 4/2017 | Hachiya .................. H02P 29/40 |
| 2017/0214356 A1 | 7/2017 | Yoshiura et al. |

FOREIGN PATENT DOCUMENTS

| | | |
|---|---|---|
| JP | 2004-032905 | 1/2004 |
| JP | 2004-274990 | 9/2004 |
| JP | 2006-223085 | 8/2006 |
| JP | 4779969 B2 | 9/2011 |
| JP | 2013-215064 | 10/2013 |
| JP | 6041075 B2 | 12/2016 |
| JP | 2017-070122 | 4/2017 |
| JP | 2017-077122 | 4/2017 |
| WO | WO 02/091558 | 11/2002 |
| WO | WO 2016/056143 | 4/2016 |

OTHER PUBLICATIONS

G. Kreisselmeier, Adaptive Observers with Exponential Rate of Convergence, IEEE Transactions on Automatic Control., vol. AC-22, No. 1, 2/8(Feb. 1977).
K.S. Narendra et al., Applications of Adaptive Control, Academic Press (1980).
R.M. Johnstone et al., Exponential convergence of recursive least squares with exponential forgetting factor, Systems and Control Letters, vol. 2, No. 2, 77/82(Aug. 1982).
Zenta Iwai et al., "Observer" Corona Publishing Co., Ltd, 1988, See Statement of Relevancy.
Japanese Office Action for corresponding JP Application No. 2017-223204, dated Jan. 22, 2019.
Japanese Office Action for corresponding JP Application No. 2017-223204, dated Jun. 11, 2019 (w/ English machine translation).

* cited by examiner

| LOAD | MOVEMENT AMOUNT | COMMAND SPEED | ACCELERATION AND DECELERATION TIME | OPERATING PATTERN | FIGURE |
|---|---|---|---|---|---|
| NO LOAD | 0.03125rev (=1/32rev) | 50min$^{-1}$ | 100ms | RECIPROCAL | 20A (22A) |
| | 3.125rev (=25/8rev) | 250min$^{-1}$ | 100ms | RECIPROCAL | 20B (22B) |
| 28-TIMES RIGID LOAD | 0.03125rev (=1/32rev) | 50min$^{-1}$ | 100ms | RECIPROCAL | 21A (23A) |
| | 3.125rev (=25/8rev) | 250min$^{-1}$ | 100ms | RECIPROCAL | 21B (23B) |

FIG. 18

| CONTROL MODE | FIGURE | TRUE VALUE | AVERAGE ESTIMATED INERTIA MOMENT RATIO (OUTPUT CORRECTION DISABLE) | FIGURE | TRUE VALUE | AVERAGE ESTIMATED INERTIA MOMENT RATIO (OUTPUT CORRECTION ENABLE) |
|---|---|---|---|---|---|---|
| POSITION CONTROL | 20A | 0 | 0 | 22A | 0 | 0 |
| | 20B | 0 | 0 | 22B | 0 | 2.21 |
| | 21A | 28 | 26.35 | 23A | 28 | 0 |
| | 21B | 28 | 26.56 | 23B | 28 | 26.62 |

FIG. 19

MOTOR CONTROL DEVICE AND METHOD OF CONTROLLING MOTOR

CROSS-REFERENCE TO RELATED APPLICATIONS

The present application claims priority under 35 U.S.C. § 119 to Japanese Patent Application No. 2017-223204, filed Nov. 20, 2017. The contents of this application are incorporated herein by reference in their entirety.

BACKGROUND

Technical Field

The technologies disclosed herein relate to a motor control device and a method of controlling a motor.

Discussion of the Background

For example, Japanese Patent No. 6,041,075 discloses a known device to control a motor.

SUMMARY

According to an aspect of the technologies disclosed herein, a motor control device includes output command calculation circuitry and inertial load value calculation circuitry. The output command calculation circuitry is configured to calculate a motor output command, based on a motor acceleration command and an inertial load value indicative of a magnitude of inertia of a load on a motor. The inertial load value calculation circuitry is configured to calculate an estimated inertial load value with an adaptive observer, based on the motor output command and a motor actual output to be output from the motor, and configured to calculate the inertial load value, based on the estimated inertial load value.

According to another aspect of the technologies disclosed herein, in a method of controlling a motor, a motor output command is calculated by output command calculation circuitry, based on a motor acceleration command and an inertial load value indicative of a magnitude of inertia of a load on a motor. An estimated inertial load value is calculated by inertial load value calculation circuitry with an adaptive observer, based on the motor output command and a motor actual output to be output from the motor. The inertial load value is calculated by the inertial load value calculation circuitry, based on the estimated inertial load value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 18 is a table of operating conditions (in position control) for experimental evaluation on the adaptive observer for the inertial load value calculator.

FIG. 19 is a table of results (average estimated inertia moment ratios) of the experimental evaluation on the adaptive observer for the inertial load value calculator.

DESCRIPTION OF THE EMBODIMENTS

Figure 1:
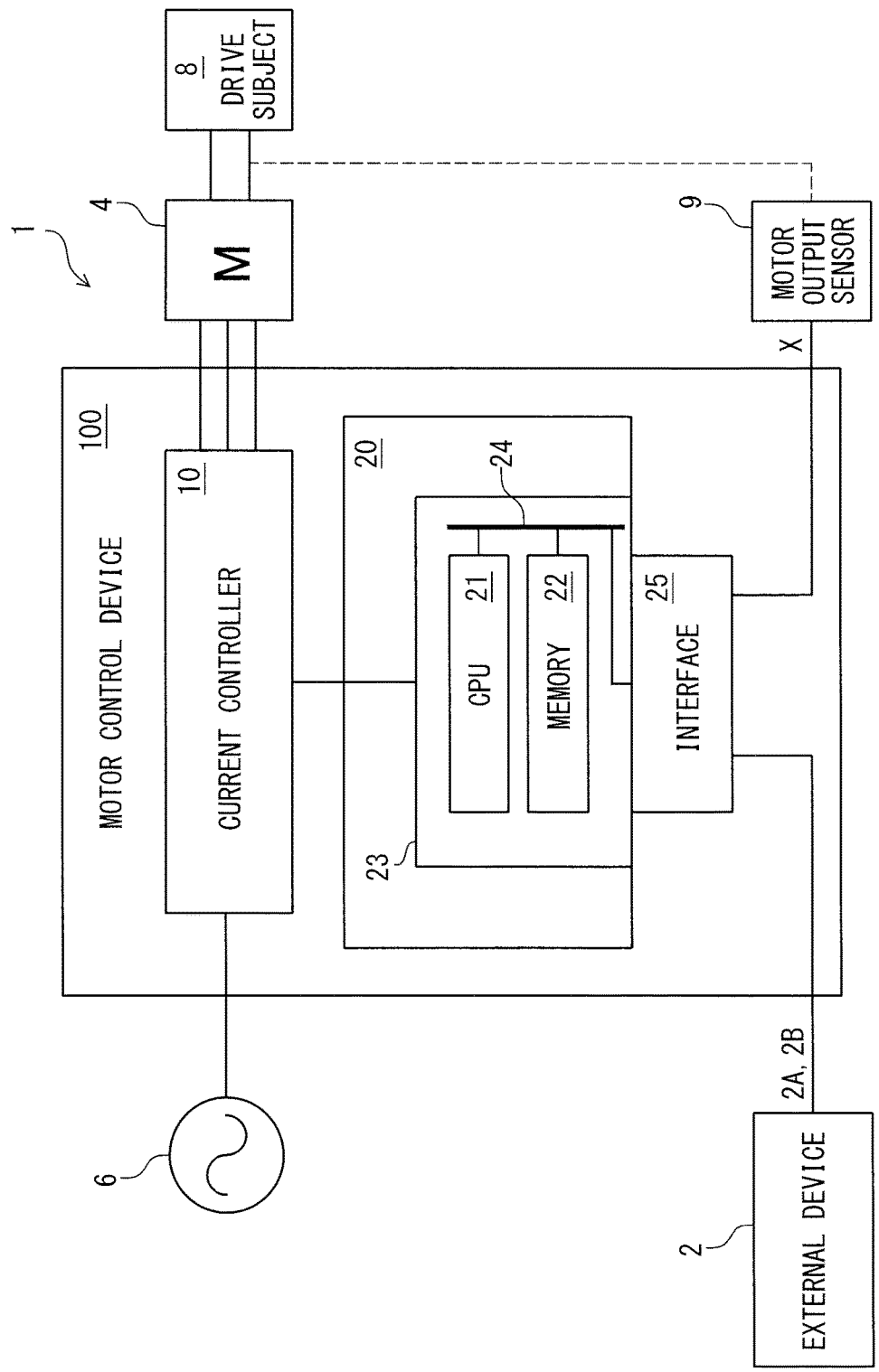
FIG. 1 is a schematic block diagram of a motor control system including a motor control device according to a first embodiment.

The embodiment(s) will now be described with reference to the accompanying drawings, wherein like reference numerals designate corresponding or identical elements throughout the various drawings.

First Embodiment

Configuration of Motor Control Device

As illustrated in FIG. 1, a motor control system 1 includes a motor control device 100 according to a first embodiment, an external device 2, a motor 4, a drive subject 8, and a motor output sensor 9. The motor control device 100 controls the motor 4, based on an external command 2A received from the external device 2. The motor control device 100 is connected to the external device 2 to receive the external command 2A. The motor control device 100 is disposed between an alternating-current (AC) power supply 6 and the motor 4. The motor control device 100 receives an AC voltage from the AC power supply 6, modulates the AC voltage in accordance with the external command 2A, and applies the resultant AC voltage to the motor 4. The motor 4 is connected to the drive subject 8. The motor control device 100 controls the motor 4, based on the external command 2A, such that the motor 4 drives the drive subject 8.

The motor control device 100 according to the first embodiment is configured to control a rotary motor; however, the technologies disclosed herein are also applicable to control over a linear motor and other motors. The motor 4 is a rotary motor but can be a different motor such as a linear motor. The motor control device 100 according to the first embodiment employs position control as a control method but can employ speed control as the control method.

Figure 2:
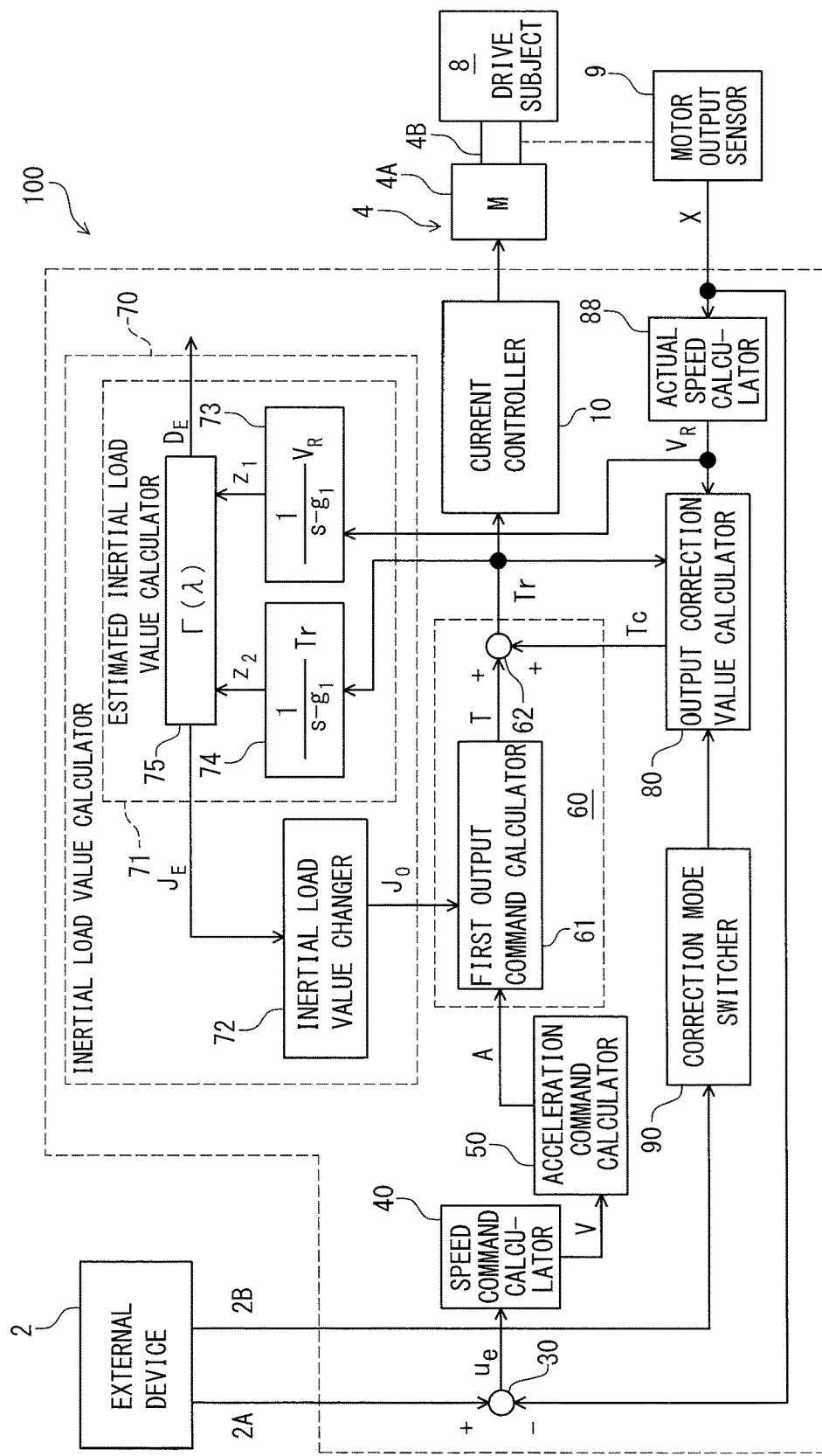
FIG. 2 is a block diagram of the motor control device illustrated in FIG. 1.

As illustrated in FIG. 2, the motor 4 includes a base member 4A and a movable member 4B. In cases where the motor 4 is a rotary motor as described in the first embodiment, the movable member 4B has a rotor rotatable relative to the base member 4A.

The motor output sensor 9 detects a motor actual output X from the motor 4. Specifically, the motor output sensor 9 detects a current position (an absolute position) of the movable member 4B as the motor actual output X. The motor output sensor 9 periodically detects the motor actual output X. The motor output sensor 9 is connected to the motor control device 100. The motor control device 100 periodically receives the motor actual output X (the current position). For example, the motor output sensor 9 includes an encoder. In cases where the motor 4 is a rotary motor as described in the first embodiment, the motor output sensor 9 includes a rotary encoder to detect a rotational position of the movable member 4B relative to the base member 4A.

Since the motor control device 100 according to the first embodiment performs the position control, the external command 2A includes a position command indicative of a target position of the motor 4, that is, a target position of the movable member 4B. In cases where the motor control device 100 performs the speed control, the external command 2A can include a speed command indicative of a target speed of the motor 4, that is, a target speed of the movable member 4B.

As illustrated in FIG. 1, the motor control device 100 includes a current controller 10, a processor 20, and an interface 25. The current controller 10 is disposed between the AC power supply 6 and the motor 4. The current controller 10 receives an AC voltage from the AC power supply 6, modulates the AC voltage, based on a command from the processor 20, and generates a drive voltage for the motor 4. The motor control device 100 according to the first embodiment includes the current controller 10; however, the current controller 10 can be a separate device from the motor control device 100.

The processor 20 includes a central processing unit (CPU) 21, a memory 22, a substrate 23, and a system bus 24. The CPU 21, the memory 22, and the system bus 24 are mounted on the substrate 23. The interface 25 is electrically connected to the system bus 24. The CPU 21, the memory 22, and the interface 25 are electrically connected to one another to establish mutual communications via the substrate 23 and the system bus 24. The interface 25 is connected to the external device 2 and the motor output sensor 9. The interface 25 receives signals from the external device 2 and motor output sensor 9 and transmits the signals to the processor 20.

The memory 22 includes a read only memory and a random access memory. For example, the CPU 21 reads a program stored in the memory 22, thereby achieving at least a part of the configuration of the motor control device 100 to be described later. Specifically, the CPU 21, the memory 22, the substrate 23, and the system bus 24 constitute control circuitry of the motor control device 100. In other words, the processor 20 can also be referred to as control circuitry 20.

However, the configuration of the processor 20 is not limited to that described in the first embodiment. For example, the CPU 21 and the memory 22 can be constituted of an integrated circuit.

As illustrated in FIG. 2, the motor control device 100 includes a position deviation calculator 30, a speed command calculator 40, and an acceleration command calculator 50. The position deviation calculator 30 calculates a position deviation $u_e$ between the external command 2A (a position command) and a motor actual output X (a current position). The speed command calculator 40 calculates a speed command V, based on the position deviation $u_e$ so as to decrease the position deviation $u_e$. The acceleration command calculator 50 calculates a motor acceleration command A, based on the speed command V.

The memory 22 stores therein the motor actual output X, the position deviation $u_e$, the speed command V, and the motor acceleration command A. The motor actual output X stored in the memory 22 is updated to its latest value each time the motor output sensor 9 detects the motor actual output X. Likewise, the position deviation $u_e$, speed command V, and motor acceleration command A stored in the memory 22 are also updated to their latest values.

In the first embodiment, the position deviation calculator 30, the speed command calculator 40, and the acceleration command calculator 50 are separated from one another. Alternatively, at least two of the position deviation calculator 30, the speed command calculator 40, and the acceleration command calculator 50 can be integrated into one. In addition, at least one of the position deviation calculator 30, the speed command calculator 40, and the acceleration command calculator 50 can be disposed outside the motor control device 100 as an external device.

As illustrated in FIG. 2, the motor control device 100 also includes an output command calculator 60. The output command calculator 60 calculates a motor output command Tr, based on the motor acceleration command A and an inertial load value $J_0$ indicative of the magnitude of inertia of a load on the motor 4. For example, the load on the motor 4 corresponds to a sum of a load on the movable member 4B of the motor 4 and a load as the drive subject 8 connected to the movable member 4B. In the first embodiment, since the motor 4 is a rotary motor, the inertial load value $J_0$ includes an inertia moment. Also, in the first embodiment, since the motor 4 is a rotary motor, the motor output command Tr includes a torque command.

The memory 22 illustrated in FIG. 1 stores therein the motor output command Tr calculated by the output command calculator 60. The motor output command Tr stored in the memory 22 is updated to its latest value each time the output command calculator 60 calculates the motor output command Tr.

As illustrated in FIG. 2, the motor control device 100 also includes an inertial load value calculator 70. The inertial load value calculator 70 calculates an estimated inertial load value $J_E$ with an adaptive observer, based on the motor actual output X output from the motor 4 and the motor output command Tr. The inertial load value calculator 70 also calculates an inertial load value $J_0$, based on the estimated inertial load value $J_E$. In the first embodiment, the inertial load value calculator 70 calculates the estimated inertial load value $J_E$ with the adaptive observer, based on the motor actual output X and the motor output command Tr, without directly using the motor acceleration command A and a command upstream from the motor acceleration command A. The inertial load value calculator 70 also calculates the estimated inertial load value $J_E$ and an estimated viscous resistance coefficient $D_E$ with the adaptive observer, based on the motor actual output X and the motor output command Tr. The estimated viscous resistance coefficient $D_E$ refers to an estimate of a sum of a viscous resistance coefficient of the motor 4 and a viscous resistance coefficient of the drive subject 8. The viscous resistance coefficient includes a viscous friction coefficient.

In the motor control system 1, the external device 2 corresponds to a device upstream from the motor control device 100, and the motor 4 corresponds to a device downstream from the motor control device 100. Examples of the command upstream from the motor acceleration command A can therefore include the external command 2A, the position deviation $u_e$, and the speed command V.

The memory 22 illustrated in FIG. 1 also stores therein the inertial load value $J_0$ calculated by the inertial load value calculator 70. The inertial load value $J_0$ stored in the memory 22 is updated to its latest value each time the inertial load value calculator 70 calculates the inertial load value $J_0$. The memory 22 also stores therein the estimated inertial load value $J_E$ calculated by the inertial load value calculator 70. The estimated inertial load value $J_E$ stored in the memory 22 is updated to its latest value each time the inertial load value calculator 70 calculates the estimated inertial load value $J_E$.

The memory 22 illustrated in FIG. 1 also stores therein an initial value of the inertial load value $J_0$ and an initial value of the estimated inertial load value $J_E$. In the first embodiment, each of the initial value of the inertial load value $J_0$ and the initial value of the estimated inertial load value $J_E$ refers to a reference inertial load value $J_M$ indicative of the magnitude of inertia of the movable member 4B in the motor 4. In an initial state in which the inertial load value $J_0$ is not calculated (e.g., on switch-on), the initial value, that is, the reference inertial load value $J_M$ stored in the memory 22 is used as the inertial load value $J_0$. In an initial state in which the estimated inertial load value $J_E$ is not calculated, the initial value of the inertial load value $J_0$, that is, the reference inertial load value $J_M$ stored in the memory 22 is used as the estimated inertial load value $J_E$. The details of the inertial load value calculator 70 will be described later.

As will be described later, the estimated viscous resistance coefficient $D_E$ is larger in error of estimation than the estimated inertial load value $J_E$ and therefore is not used for the control by the motor control device 100.

As illustrated in FIG. 2, the motor control device 100 also includes an output correction value calculator 80. The output correction value calculator 80 calculates an output correction value Tc, based on the motor actual output X and the motor output command Tr. The motor control device 100 according to the first embodiment also includes an actual speed calculator 88. The actual speed calculator 88 differentiates the motor actual output X from the motor 4 to calculate an actual speed $V_R$ of the motor 4. The output correction value calculator 80 calculates the output correction value Tc, based on the actual speed $V_R$ and the motor output command Tr. The output correction value calculator 80 estimates a disturbance of the motor 4 to calculate the output correction value Tc. Specifically, the output correction value calculator 80 calculates the output correction value Tc with a disturbance observer. The output correction value calculator 80 can calculate the output correction value Tc with any configuration in addition to the disturbance observer. In cases where the motor 4 is a rotary motor as described in the first embodiment, the output correction value Tc includes a torque correction value. The output correction value Tc is used for calculation of the motor output command Tr by the output command calculator 60.

The memory 22 illustrated in FIG. 1 also stores therein the output correction value Tc calculated by the output correction value calculator 80. The output correction value Tc stored in the memory 22 is updated to its latest value each time the output correction value calculator 80 calculates an output correction value Tc.

The output command calculator 60 includes a first output command calculator 61 and a second output command calculator 62. The first output command calculator 61 calculates an output command T, based on the motor acceleration command A and the inertial load value $J_0$. The second output command calculator 62 calculates a motor output command Tr, based on the output command T and the output correction value Tc. Specifically, the first output command calculator 61 multiplies the motor acceleration command A by the inertial load value $J_0$ to calculate the output command T. In cases where the motor 4 is a rotary motor as described in the first embodiment, the output command T corresponds to a torque command. The second output command calculator 62 adds the output correction value Tc to the output command T to calculate the motor output command Tr. The second output command calculator 62 and the output correction value calculator 80 correct the output command T. In the first embodiment, the output command calculator 60 includes the first output command calculator 61 and the second output command calculator 62. However, the configuration of the output command calculator 60 is not limited to that described in the first embodiment.

Figure 3:
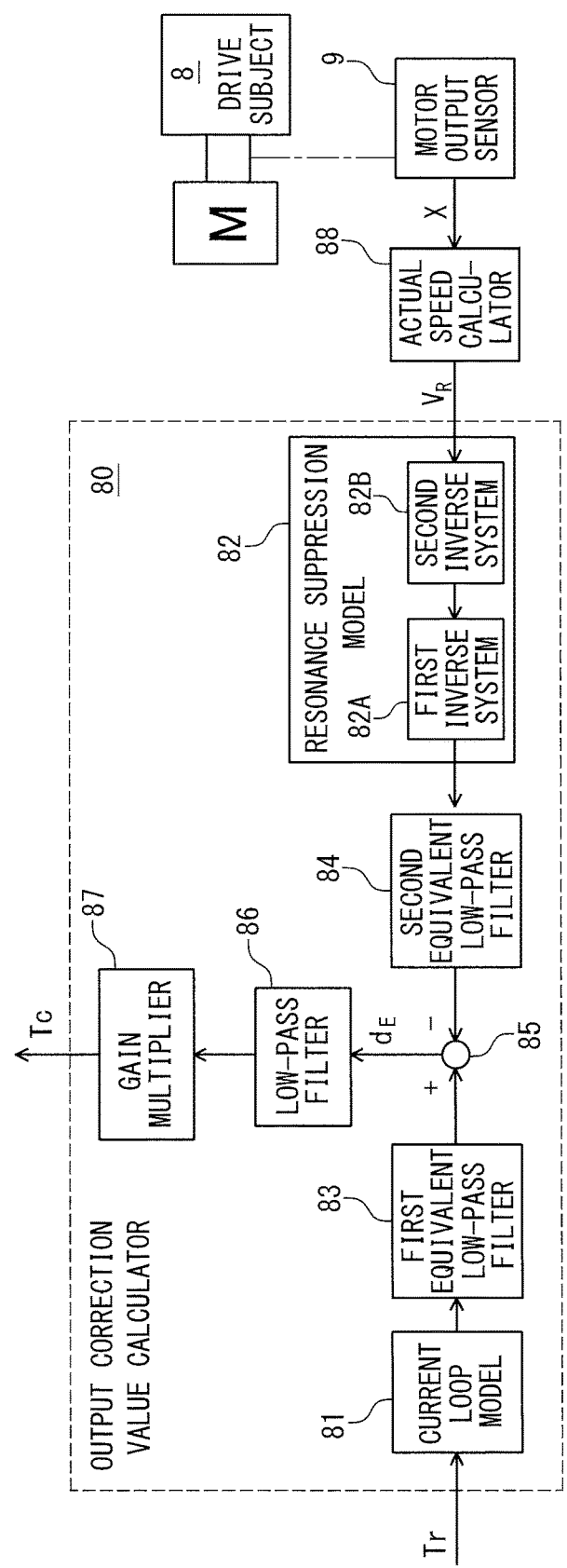
FIG. 3 is a block diagram of an output correction value calculator in the motor control device illustrated in FIG. 2.

As illustrated in FIG. 3, the output correction value calculator 80 includes a disturbance observer designed as a state observer in which a model (e.g., a nominal model) receiving a disturbance is incorporated. In the first embodiment, the output correction value calculator 80 includes a current loop model 81, a resonance suppression model 82, a first equivalent low-pass filter 83, a second equivalent low-pass filter 84, a subtractor 85, a low-pass filter 86, and a gain multiplier 87.

The current loop model 81 suppresses an increase in gain of mechanical resonance due to an influence of a current control system loop. The current loop model 81 generates a motor output command signal in which a delay in current control system loop is taken into consideration in an approximation manner for the motor output command Tr.

The resonance suppression model 82 generates an acceleration torque signal for an ideal motor, that is, a torque component for use in acceleration and deceleration by an ideal motor assumed using the nominal model. Specifically, the resonance suppression model 82 includes a first inverse system 82A and a second inverse system 82B. The first inverse system 82A is constructed for a frequency characteristic controller to control a frequency characteristic of the actual speed $V_R$ of the motor 4. The second inverse system 82B is constructed for a mechanical rigid body system in the drive subject 8. The second inverse system 82B multiplies an output from the first inverse system 82A (i.e., an acceleration of the drive subject 8 to be driven by the motor 4) by the reference inertial load value $J_M$ of the movable member 4B in the motor 4. The second inverse system 82B also multiplies the output from the first inverse system 82A by an operator s.

Each of the first equivalent low-pass filter 83 and the second equivalent low-pass filter 84 determines a frequency band of the disturbance observer. The first equivalent low-pass filter 83 removes a high-frequency component from a motor output signal generated by the current loop model 81. The second equivalent low-pass filter 84 removes a high-frequency component from a reference acceleration signal generated by the resonance suppression model 82. The subtractor 85 subtracts a signal passing through the second equivalent low-pass filter 84 from a signal passing through the first equivalent low-pass filter 83 to calculate an estimated disturbance output $d_E$. The estimated disturbance output $d_E$ is an estimate of a disturbance output (e.g., a disturbance torque) acting on the movable member 4B in the motor 4. The low-pass filter 86 removes, from the estimated disturbance output $d_E$, harmonic noise set with a time constant. The gain multiplier 87 adjusts the estimated disturbance output $d_E$ with a predetermined gain to calculate an output correction value Tc.

As illustrated in FIG. 2, the inertial load value calculator 70 includes an estimated inertial load value calculator 71 and an inertial load value changer 72. The estimated inertial load value calculator 71 calculates the estimated inertial load value $J_E$ with the adaptive observer, based on the motor actual output X and the motor output command Tr. The inertial load value changer 72 changes the inertial load value $J_0$, based on the estimated inertial load value $J_E$. The estimated inertial load value calculator 71 calculates the estimated inertial load value $J_E$ and the estimated viscous resistance coefficient $D_E$ with the adaptive observer, based on the motor actual output X and the motor output command Tr.

The inertial load value calculator 70 includes a first state amount calculator 73, a second state amount calculator 74, and an adaptive identification calculator 75. The first state amount calculator 73 calculates a first state amount $Z_1$, based on a state setting $g_1$ and the motor actual output X. The second state amount calculator 74 calculates a second state amount $Z_2$, based on the state setting $g_1$ and the motor output command Tr. The adaptive identification calculator 75 calculates the estimated inertial load value $J_E$, based on the first state amount $Z_1$ and the second state amount $Z_2$. Each of the first state amount calculator 73 and the second state amount calculator 74 corresponds to a state variable filter of the adaptive observer.

The state setting $g_1$ is used for calculating the first state amount $Z_1$ and the second state amount $Z_2$ and is stored in the memory 22. The adaptive observer causes the inertial load value calculator 70 to accurately calculate the estimated inertial load value $J_E$ in a relatively short time. The adaptive observer will be described later.

Figure 4:
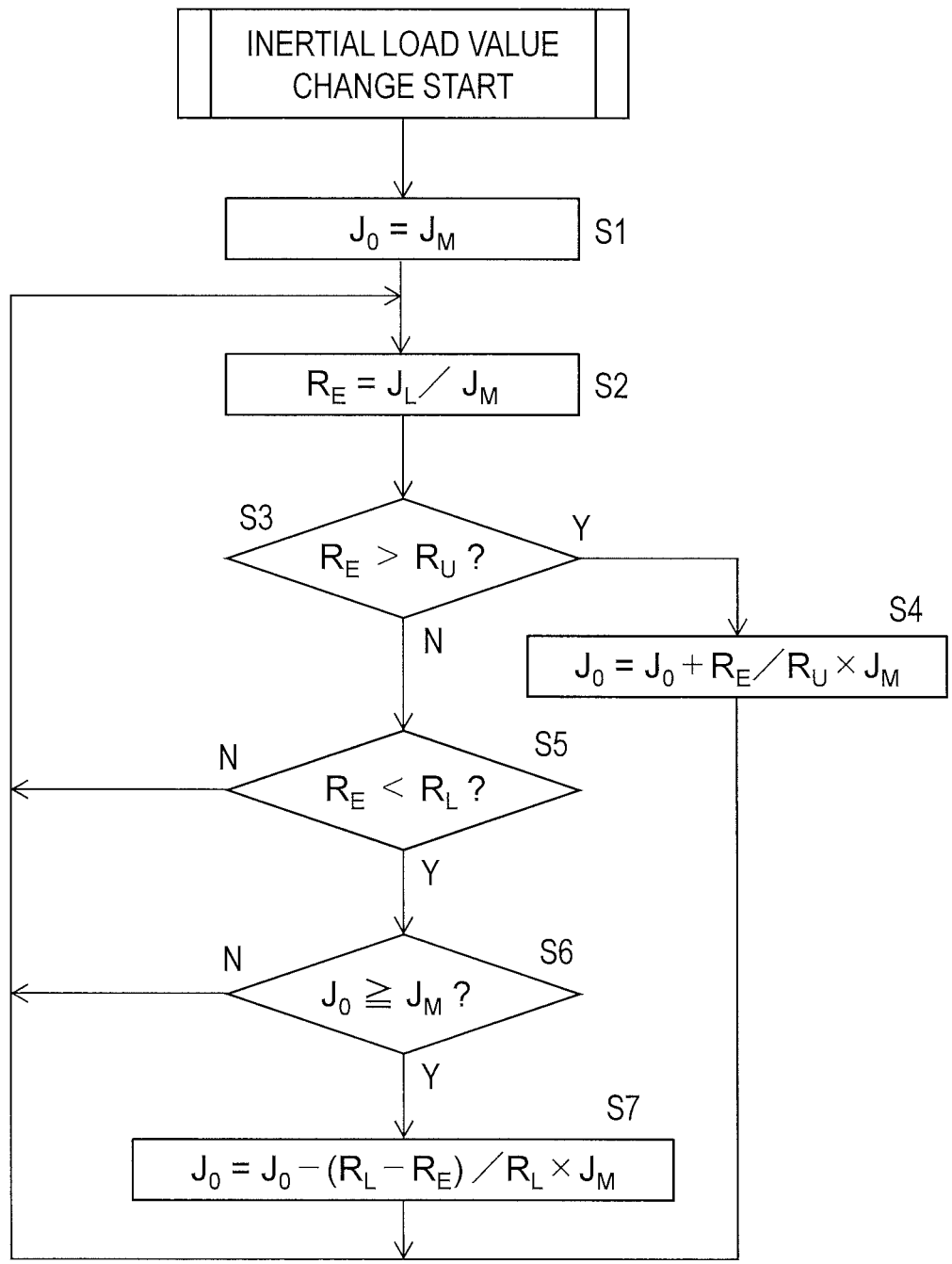
FIG. 4 is a flowchart of an inertial load value changing process to be executed by the motor control device illustrated in FIG. 2.

FIG. 4 is a flowchart of an inertial load value changing process to be executed by the inertial load value changer 72. As illustrated in FIG. 4, the inertial load value changer 72 changes the inertial load value $J_0$, based on a reference inertial load range and the estimated inertial load value $J_E$. Specifically, in Step S1, the inertial load value changer 72 sets, as an initial value of the inertial load value $J_0$, the reference inertial load value $J_M$ indicative of the magnitude of inertia of the movable member 4B in the motor 4. The inertial load value $J_0$ is stored in the memory 22 illustrated in FIG. 1. In Step S2, the inertial load value changer 72 calculates, as an estimated inertial load ratio $R_E$, a ratio $(J_L/J_M)$ of a target inertial load value $J_L$ to be obtained by subtracting the reference inertial load value $J_M$ from the estimated inertial load value $J_E$, to the reference inertial load value $J_M$. The target inertial load value $J_L$ refers to an estimate of an inertial load value of the drive subject 8 connected to the movable member 4B.

The reference inertial load range is defined for determining whether the inertial load value $J_0$ to be used by the output command calculator 60 is set at an appropriate value for the drive subject 8. When the estimated inertial load ratio $R_E$ is within the reference inertial load range, it is determined that the inertial load value $J_0$ to be used by the output command calculator 60 is set at a relatively appropriate value for the drive subject 8.

On the other hand, when the estimated inertial load ratio $R_E$ is out of the reference inertial load range, it is determined that the inertial load value $J_0$ to be used by the output command calculator 60 is set at a more appropriate value in order to enhance the stability in control. In the first embodiment, accordingly, the inertial load value changer 72 changes the inertial load value $J_0$ when the estimated inertial load ratio $R_E$ is out of the reference inertial load range. On the other hand, the inertial load value changer 72 does not change the inertial load value $J_0$ when the estimated inertial load ratio $R_E$ is within the reference inertial load range.

The reference inertial load range has an upper limit value $R_U$ and a lower limit value $R_L$. The upper limit value $R_U$ is larger than the lower limit value $R_L$. In the first embodiment, the reference inertial load range is defined as a range of an inertial load ratio. Each of the upper limit value $R_U$ and the lower limit value $R_L$ therefore corresponds to the inertial load ratio. For example, when the reference inertial load range corresponds to a range from 10 to 20 times of the inertial load ratio, the upper limit value $R_U$ is 20 and the lower limit value $R_L$ is 10. The memory 22 stores therein the upper limit value $R_U$ and lower limit value $R_L$ of the reference inertial load range. In the first embodiment, the upper limit value $R_U$ and lower limit value $R_L$ of the reference inertial load range each have a fixed value. For example, the upper limit value $R_U$ and lower limit value $R_L$, of the reference inertial load range can be set by a user or can be obtained by calculation. The inertial load ratio is a ratio $(J_{LR}/J_M)$ of an actual target inertial load value $J_{LR}$ indicative of the magnitude of inertial of the drive subject 8, to the reference inertial load value $J_M$.

As illustrated in FIG. 4, in Steps S3 and S4, the inertial load value changer 72 increases the inertial load value $J_0$ when the estimated inertial load ratio $R_E$ is larger than the upper limit value $R_U$ of the reference inertial load range. Specifically, in Steps S3 and S4, the inertial load value changer 72 increases the inertial load value $J_0$ with the estimated inertial load value $J_E$ when the estimated inertial load ratio $R_E$ is larger than the upper limit value $R_U$ of the reference inertial load range. In the first embodiment, the inertial load value changer 72 sets a new inertial load value $J_0$, based on, for example, the following equation so as to increase the inertial load value $J_0$ as a difference between the estimated inertial load ratio $R_E$ and the upper limit value $R_U$ is larger.

$$J_0 = J_0 + \frac{R_E}{R_U} J_M$$

For example, when the upper limit value $R_U$ is 20 and the estimated inertial load ratio $R_E$ is 60, the inertial load value changer 72 sets a new inertial load value $J_0$ by adding a value given by $(60/20) \times J_M = 3 \times J_M$ to the inertial load value $J_0$.

On the other hand, in Steps S3 and S5, the inertial load value changer 72 compares the estimated inertial load ratio $R_E$ with the lower limit value $R_L$ of the reference inertial load range when the estimated inertial load ratio $R_E$ is equal to or less than the upper limit value $R_U$ of the reference inertial load range. In Steps S5, S6, and S7, the inertial load value changer 72 decreases the inertial load value $J_0$ when the estimated inertial load ratio $R_E$ is smaller than the lower limit value $R_L$ of the reference inertial load range. Specifically, in Steps S5, S6, and S7, the inertial load value changer 72 decreases the inertial load value $J_0$ with the estimated inertial load value $J_E$ when the estimated inertial load ratio $R_E$ is smaller than the lower limit value $R_L$ of the reference inertial load range. In the first embodiment, in Steps S5 and S6, the inertial load value changer 72 determines whether the inertial load value $J_0$ is equal to or more than the reference inertial load value $J_M$ when the estimated inertial load ratio $R_E$ is smaller than the lower limit value $R_L$ of the reference inertial load range. In Step S6, the inertial load value changer 72 does not decrease the inertial load value $J_0$ when the inertial load value $J_0$ is less than the reference inertial load value $J_M$, and then this process returns to Step S2. On the other hand, in Steps S6 and S7, when the inertial load value $J_0$ is equal to or more than the reference inertial load value $J_M$, the inertial load value changer 72 sets a new inertial load value $J_0$, based on, for example, the following equation so as to decrease the inertial load value $J_0$ as a difference between the estimated inertial load ratio $R_E$ and the lower limit value $R_L$ is larger.

$$J_0 = J_0 - \frac{(R_L - R_E)}{R_L} J_M$$

For example, when the lower limit value $R_L$ is 10 and the estimated inertial load ratio $R_E$ is 6, the inertial load value changer 72 sets a new inertial load value $J_0$ by subtracting a value given by $((10-6)/10) \times J_M = 0.4 \times J_M$ from the inertial load value $J_0$.

As described above, a new inertial load value $J_0$ is calculated with the estimated inertial load ratio $R_E$ in Steps S4 and S7. This configuration reduces an influence on motor control and enhances the stability in motor control as a whole even if an error of estimation becomes momentarily large as to the estimated inertial load value $J_E$.

In Steps S4 and S7, the estimated inertial load value $J_E$ can be set as the inertial load value $J_0$ without being changed (i.e., $J_0 = J_E$). This configuration improves a processing speed for the inertial load value changing process.

Also, in the first embodiment, the reference inertial load range is set to be narrower than a compensation range for the inertial load ratio of the motor control device 100 in order to allow for the stability in control by the motor control device 100. The reference inertial load range can be equal to the compensation range for the inertial load ratio.

As illustrated in FIG. 2, the motor control device 100 also includes a correction mode switcher 90. The output correction value calculator 80 has an output correction enable mode and an output correction disable mode. The correction mode switcher 90 receives a correction mode switch command 2B from the external device 2 and switches a mode of the output correction value calculator 80 between the output correction enable mode and the output correction disable mode in accordance with the correction mode switch command 2B.

In the output correction enable mode, as described above, the output command T is corrected with the output correction value Tc calculated by the output correction value calculator 80, and then the motor output command Tr is calculated. Also, in the output correction enable mode, the inertial load value $J_0$ is changed with the estimated inertial load value $J_E$ by the inertial load value changer 72.

In the output correction disable mode, on the other hand, the functions of the output correction value calculator 80 and inertial load value changer 72 are disabled. In the output correction disable mode, specifically, the output correction value Tc is set at 0, and the output command T is used as the motor output command Tr without being changed. Also, in the output correction disable mode, the processing to be executed by the inertial load value changer 72 is disabled. The estimated inertial load value $J_E$ calculated by the estimated inertial load value calculator 71 is therefore used as the inertial load value $J_0$ without being changed, in the output command calculator 60. In the output correction disable mode, the motor control device 100 has configurations substantially the same as those of a motor control device 200 according to a second embodiment to be described later.

Motor Control Method

Figure 5:
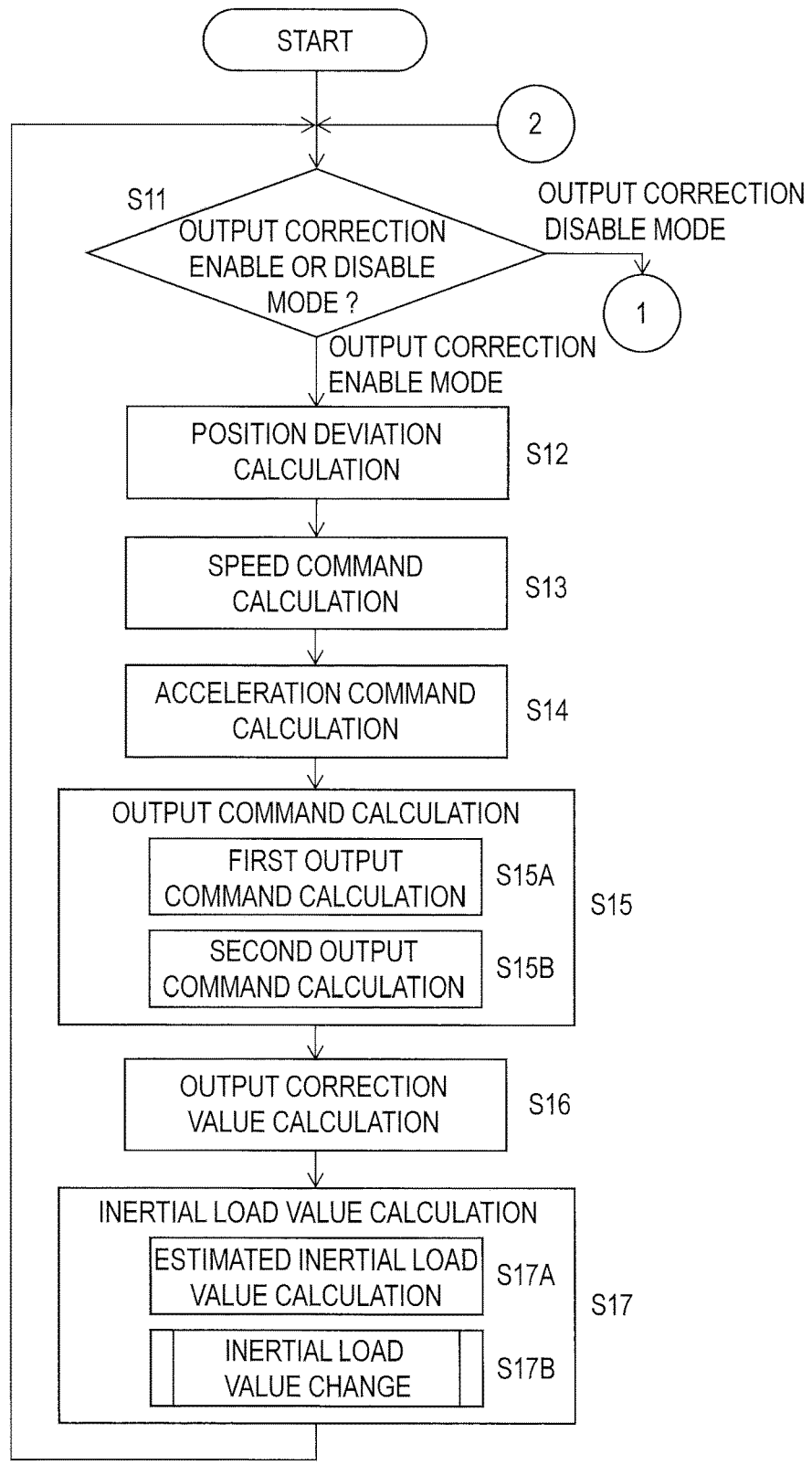
FIG. 5 is a flowchart of a motor control method to be performed by the motor control device illustrated in FIG. 2.
Figure 6:
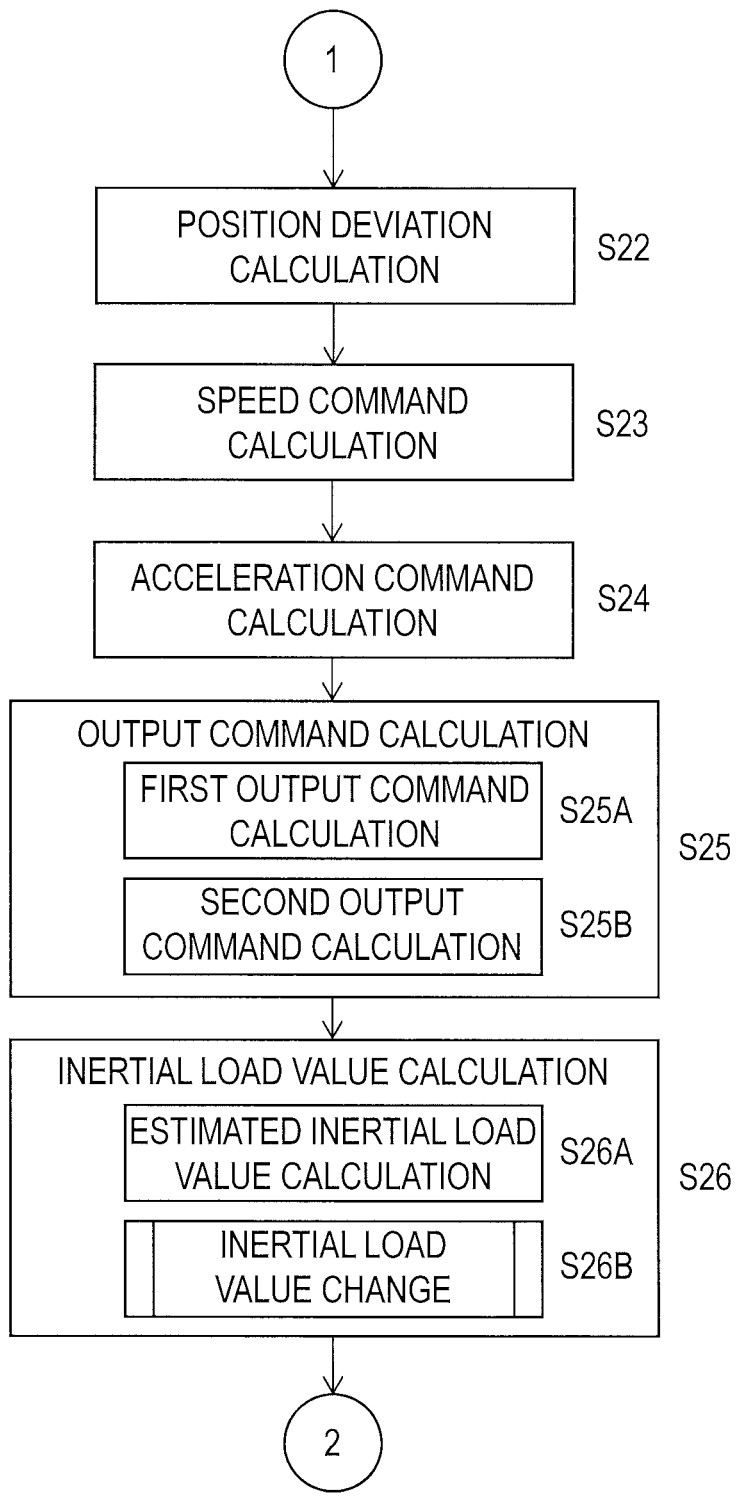
FIG. 6 is a flowchart of the motor control method to be performed by the motor control device illustrated in FIG. 2.

With reference to FIGS. 5 and 6, a description will be given of a motor control method to be performed by the motor control device 100.

As illustrated in FIGS. 5 and 6, the motor control method according to the first embodiment includes a mode detecting step, a speed command calculating step, an acceleration command calculating step, an output command calculating step, an output correction value calculating step, an inertial load value calculating step, and an inertial load value changing step.

In the mode detecting step S11, the correction mode switcher 90 detects which one of the output correction enable mode and the output correction disable mode is selected as a mode of the motor control device 100, based on a correction mode switch command 2B. As illustrated in FIG. 5, when the output correction enable mode is selected, Steps S12 to S17 are carried out. As illustrated in FIGS. 5 and 6, when the output correction disable mode is selected, Steps S22 to S26 are carried out.

As illustrated in FIG. 5, when the output correction enable mode is selected, in the position deviation calculating step S12, the position deviation calculator 30 calculates a position deviation $u_e$, based on the external command 2A and the motor actual output X. In the speed command calculating step S13, the speed command calculator 40 calculates a speed command V, based on the position deviation $u_e$. In the acceleration command calculating step S14, the acceleration command calculator 50 calculates a motor acceleration command A, based on the speed command V.

In the output command calculating step S15, the output command calculator 60 calculates the motor output command Tr, based on the inertial load value $J_0$ and the motor acceleration command A. Specifically, the output command calculating step S15 includes a first output command calculating step S15A and a second output command calculating step S15B. In the first output command calculating step S15A, the output command calculator 60 calculates the output command T, based on the motor acceleration command A and the inertial load value $J_0$. In the second output command calculating step S15B, the output command calculator 60 calculates the motor output command Tr, based on the output command T and the output correction value Tc.

In the output correction value calculating step S16, the output correction value calculator 80 calculates the output correction value Tc, based on the motor actual output X and the motor output command Tr. In the output correction value calculating step S16, the output correction value calculator 80 estimates a disturbance of the motor 4 to calculate the output correction value Tc.

In the inertial load value calculating step S17, the inertial load value calculator 70 calculates the estimated inertial load value $J_E$ with the adaptive observer, based on the motor actual output X and the motor output command Tr. The inertial load value calculator 70 then calculates the inertial load value $J_0$, based on the estimated inertial load value $J_E$. Specifically, the inertial load value calculating step S17 includes an estimated inertial load value calculating step S17A and an inertial load value changing step S17B. In the estimated inertial load value calculating step S17A, the estimated inertial load value calculator 71 calculates the estimated inertial load value $J_E$ with the adaptive observer, based on the motor actual output X and the motor output command Tr. In the inertial load value changing step S17B, the inertial load value changer 72 changes the inertial load value $J_0$, based on the estimated inertial load value $J_E$. The inertial load value changing step S17B includes Steps S1 to S7 illustrated in FIG. 4. The details of the inertial load value changing step S17B have been described above; therefore, the repetitive description thereof will not be given here.

In the flowcharts of FIGS. 5 and 6, the steps are arranged in time sequence seemingly for the sake of convenience of illustration; however, the sequence of the steps is not limited to those illustrated in FIGS. 5 and 6. For example, at least two of the steps can be carried out in parallel.

As illustrated in FIGS. 5 and 6, when the output correction disable mode is selected, the position deviation calculating step S22, the speed command calculating step S23, the acceleration command calculating step S24, the output command calculating step S25, and the inertial load value calculating step S26 are carried out. These steps S22 to S26 are respectively equal to the steps S12 to S15 and S17 in FIG. 5. However, the output correction disable mode is different from the output correction enable mode in that the output correction value calculating step S16 is omitted in the output correction disable mode. In the output correction disable mode, therefore, the motor output command Tr is not corrected with the output correction value Tc, so that the output command T is used as the motor output command Tr without being changed.

Configuration of Adaptive Observer

In the motor control device 100, as described above, the estimated inertial load value $J_E$ is calculated with the adaptive observer, unlike the output correction value calculator 80. Next, a specific description will be given of the adaptive observer to be applied to the estimated inertial load value calculator 71. It should be noted that a non-patent document "Observer" (CORONA PUBLISHING CO., LTD, Zenta IWAI et al.) is incorporated herein by reference.

The adaptive observer for the estimated inertial load value calculator 71 expresses a control subject with output signals ($Z_1$, $Z_2$) from two state variable filters (i.e., the first state amount calculator 73 and the second state amount calculator 74) each receiving an input signal (i.e., the motor output command Tr) to and an output signal (i.e., the motor actual output X) from the control subject. The adaptive observer for the estimated inertial load value calculator 71 also introduces a parameter identification mechanism for the control subject to reduce an influence to be exerted on an error of state estimation of an error of parameter estimation, with a lapse of time.

An n-order control subject is considered first. The n-order control subject is controllable with one input/output, is observable, and is expressed by Equations (1) and (2).

$$\dot{x}(t)=Ax(t)+bu(t), x(0)=x_0 \quad (1)$$

$$y(t)=c^T x(t) \quad (2)$$

In Equations (1) and (2), x represents an n-order state vector. In addition, u and y respectively represent a scalar input and a scalar output of which the amounts are detectable. It is assumed herein that factors of an n×n matrix A, an n-order vector b, and an n-order vector c are respectively unknown and constants. It can be inferred that Equations (1) and (2) are each in the form of minimal realization equivalent to a transfer function expressed by Equation (3) since Equations (1) and (2) are controllable and observable.

$$G_p(s) = c^T(sI-A)^{-1}b = \frac{\beta_n s^{n-1} + \ldots + \beta_2 s + \beta_1}{s^n + \alpha_n s^{n-1} + \ldots + \alpha_2 s + \alpha_1} \quad (3)$$

This means that, as represented by ($\alpha_i$, $\beta_i$), i=1, 2, . . . , n in Equation (3), the control subject expressed by Equations (1) and (2) has essentially unknown parameters, the number of which is 2n. By appropriately selecting state settings, accordingly, Equations (1) and (2) do not lose generality as being expressed in the observable canonical form including the following 2n unknown parameters.

$$\dot{x}(t) = \begin{bmatrix} a & h^T \\ & F \end{bmatrix} x(t) + bu(t), x(0) = x_0 \quad (4)$$

$$y(t) = c^T x(t) = [1, 0, \ldots, 0]x(t) \quad (5)$$

In Equations (4) and (5), a and b each represent an n-order unknown constant vector. In addition, h and F respectively represent an n−1-order known vector and a (n−1)×(n−1)-order known matrix. It should be noted that ($h^T$, F) is an observable pair. In this case, h and F can be expressed as follows, for example.

$$h^T = [1, 0, \ldots, 0],$$

$$F = \begin{bmatrix} 0 & 1 & & 0 \\ \vdots & \ddots & \ddots & \\ \vdots & & \ddots & 1 \\ 0 & \ldots & \ldots & 0 \end{bmatrix}$$

Moreover, the following asymptotically stable n×n matrix G is introduced.

$$G = \begin{bmatrix} g & h^T \\ & F \end{bmatrix}$$

Since ($h^T$, F) is an observable pair, ($C^T$, G) is also an observable pair. Using the matrix G, Equations (4) and (5) can be rewritten as follows.

$$\dot{x}(t) = Gx(t) + (a-g)y(t) + bu(t), x(0) = x_0 \quad (6)$$

$$y(t) = c^T x(t) \quad (7)$$

Equations (6) and (7) are each in the form of minimal realization suitable for the configuration of the adaptive observer.

In addition, the following form of non-minimal realization for the control subject is derived from these forms. It is assumed in the following description that a Kreisselmeier form (K-type) is employed as the form of non-minimal realization for the control subject. The following n×n matrix filter and n-order state variable filter are considered, each of which receives an input u to and an output y from the control subject.

$$\begin{cases} \dot{P}_1(t) = GP_1(t) + I_n y(t), P_1(0) = 0 \\ \dot{P}_2(t) = GP_2(t) + I_n u(t), P_2(0) = 0 \end{cases} \quad (8)$$

$$\begin{cases} \dot{z}_1(t) = G^T z_1(t) + cy(t), z_1(0) = 0 \\ \dot{z}_2(t) = G^T z_2(t) + cu(t), z_2(0) = 0 \end{cases} \quad (9)$$

In this case, the control subject expressed by Equations (6) and (7) can be expressed as follows using Equations (8) and (9).

$$x(t) = P(t)\Theta + f_e(t) \quad (10)$$

$$y(t) = z(t)^T \Theta + f(t) \quad (11)$$

Equations (10) and (11) are each referred to as a K-type expression for the control subject, and z(t) in Equation (11) is referred to as a regression vector.

With regard to Equations (10) and (11), P(t), z(t), Θ, fe(t), and f(t) are defined as follows.

$$P(t) = [P_1, P_2]$$

$$z(t) = [z_1(t)^T, z_2(t)^T]^T$$

$$\Theta = [(a-g)^T, b^T]^T$$

$$f_e(t) = e^{Gt} x_0 \quad (12)$$

$$f(t) = c^T e^{Gt} x_0 \quad (13)$$

The adaptive observer based on the K-type expression has a structure corresponding to Equations (10) and (11). A state estimate, an output estimate, and a parameter estimate are respectively placed as $\hat{x}(t)$, $\hat{y}(t)$, and $\hat{\Theta}(t)$, so that Equations (14) and (15) are established from Equations (10) and (11). Equations (14) and (15) each represent the adaptive observer.

$$\hat{x}(t) = P(t)\hat{\Theta}(t) \quad (14)$$

$$\hat{y}(t) = \hat{z}(t)^T \hat{\Theta}(t) \quad (15)$$

At this time, an error of state estimation, an error of output estimation, and an error of parameter estimation are respectively placed as follows.

$$E(t) = \hat{x}(t) - x(t)$$

$$e(t) = \hat{y}(t) - y(t)$$

$$\zeta(t) = \hat{\Theta}(t) - \Theta(t)$$

The following equations are thus established from Equations (10), (11), (14), and (15).

$$E(t) = P(t)\zeta(t) - f_e(t)$$

$$e(t) = z(t)^T \zeta(t) - f(t)$$

The following equation is established since the matrix G is asymptotically stable $$\left( \lim_{t \to \infty} e^{Gt} = 0 \right).$$

$$\lim_{t \to \infty} f_e(t) = 0, \lim_{t \to \infty} f(t) = 0$$

Therefore, when a variable estimate vector $\hat{\Theta}(t)$ is configured to approach a true value Θ(t), the error of parameter estimation ζ(t) approaches 0. The error of state estimation E(t) and the error of output estimation e(t) thus converge on 0 as long as P(t) is bounded.

When the variable estimate vector $\hat{\Theta}(t)$ is adjusted such that a difference between the variable estimate vector $\hat{\Theta}(t)$ and the true value Θ(t) (i.e., the error of parameter estimation ζ(t)) approaches 0, the state estimate $\hat{x}(t)$ approaches the true value. A parameter identification algorithm to determine the variable estimate vector $\hat{\Theta}(t)$ is referred to as an adaptive identification rule or an adaptive adjustment rule.

The first embodiment employs an adaptive identification rule based on the weighted least squares method.

In this case, the output from the control subject expressed by Equations (1) and (2) is expressed by $y(t) = z(t)^T \Theta$, using the regression vector z(t) and the unknown parameter Θ. An estimate given by $\hat{y}(t) = \hat{z}(t)^T \hat{\Theta}(t)$ is considered.

The corresponding error models are as follows.

$$E(t) = z(t)^T \zeta(t)$$

$$e(t) = \hat{y}(t) - y(t)$$

$$\zeta(t) = \hat{\Theta}(t) - \Theta(t)$$

It is assumed herein that the parameter estimate is determined to minimize the following weighted error square integral. In the weighted error square integral, λ(≥0) represents a weighting factor.

$$J(t) = \int_0^t \{\hat{y}(t,\tau) - y(\tau)\}^2 e^{-\lambda(t-\tau)} d\tau$$

$$\hat{y}(t,\tau) = z(t)^T \hat{\Theta}(t)$$

This solution is given by a variable estimate vector $\hat{\Theta}(t)$ satisfying the following equation.

$$\frac{\partial J(t)}{\partial \hat{\Theta}(t)} = 0$$

It is apparent from the above description that the variable estimate vector $\hat{\Theta}(t)$ is a solution of the following three equations.

$$\Gamma(t)\hat{\Theta}(t) = \gamma(t)$$

$$\Gamma(t) = \int_0^t z(\tau)z(\tau)^T e^{-\lambda(t-\tau)} d\tau$$

$$\gamma(t) = \int_0^t y(\tau)z(\tau)e^{-\lambda(t-\tau)} d\tau$$

The following equations are established by differentiation of the above equations on the assumption that $\Gamma(t)$ is regular.

$$\dot{\hat{\Theta}}(t) = -\Gamma(t)^{-1}z(t)e(t) \tag{16}$$

$$\dot{\Gamma}(t) = -\lambda\Gamma(t) + z(t)z(t)^T \tag{17}$$

In Equations (16) and (17), a relation of $\Gamma(0)=\gamma I_{2n}$ ($\gamma$: a minute positive number) is satisfied. Equations (16) and (17) are each referred to as a weighted least squares adaptive identification rule.

Figure 7:
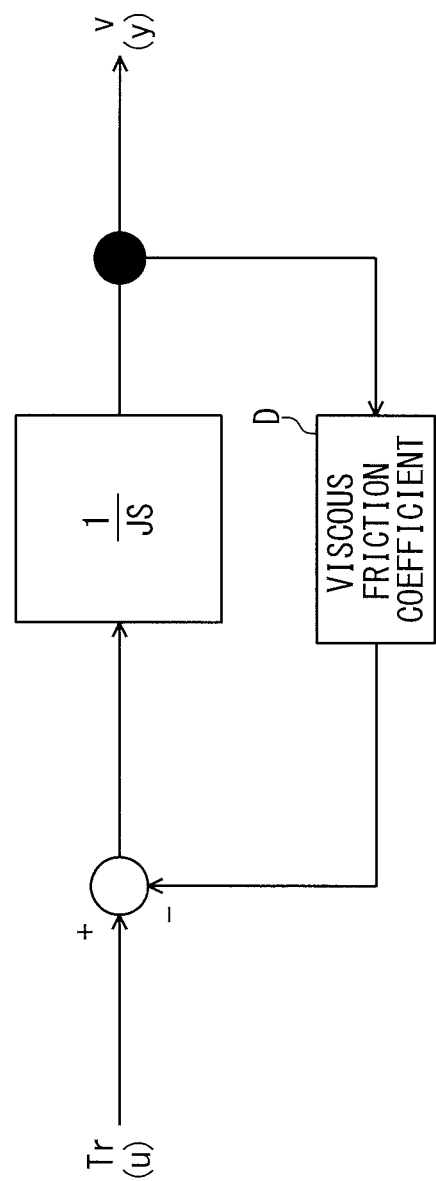
FIG. 7 is a block diagram of a model of a control subject employed as to an adaptive observer for an inertial load value calculator.

A model illustrated in FIG. 7 is considered as the control subject expressed by Equations (1) and (2). In this model, a drive subject receives the motor output command Tr to move at a speed v under an influence of an inertial load value J and a viscous friction coefficient D. Specifically, the control subject illustrated in FIG. 7 is expressed by Equations (18) and (19).

$$\dot{v} = Dv + \frac{1}{J}Tr \tag{18}$$

$$y = v \tag{19}$$

Next, placing x, u, a, h, F, and b as follows yields a relation of $G = g_1$ ($g_1$: an arbitrary real number).
x=v
u=Tr
a=D
h=0
F=0
b=1/J Equations (18) and (19) can be transformed as the following equations corresponding to Equations (6) and (7).

$$\dot{v} = Gv + (a - g_1)y + \frac{1}{J}Tr \tag{20}$$

$$= g_1 v + (D - g_1)v + \frac{1}{J}Tr$$

$$y = v \tag{21}$$

Since Equations (20) and (21) are each in the form of minimal realization, $\Theta$ is placed as follows for transformation into the form of K-type non-minimal realization.

$$\Theta = [(a - g_1)^T \quad b^T]^T$$

$$= \begin{bmatrix} D - g_1 \\ 1/J \end{bmatrix}$$

The following equation is established as an equation corresponding to Equation (11).

$$y = [z_1 \quad z_2]\begin{bmatrix} \hat{D} - g_1 \\ 1/\hat{J} \end{bmatrix} + e^{g_1 t}v(0) \tag{22}$$

The following equations are established when the adaptive observer is configured as expressed by Equation (15).

$$\hat{y} = [z_1 \quad z_2]\hat{\Theta} \tag{23}$$

$$= [z_1 \quad z_2]\begin{bmatrix} D - g_1 \\ 1/J \end{bmatrix}$$

$$\dot{\hat{\Theta}} = -\Gamma^{-1}\begin{bmatrix} z_1 \\ z_2 \end{bmatrix}e \tag{24}$$

In Equation (24), a relation of $\Gamma = \Gamma^T > 0$ is satisfied, and the matrix $\Gamma$ has an initial value placed as follows.

$$\Gamma(0) = \begin{bmatrix} \gamma & 0 \\ 0 & \gamma \end{bmatrix}$$

($\gamma$: a minute positive number)
In addition, e represents Equation (25).

$$e = \hat{y} - y \tag{25}$$

At this time, an equation corresponding to Equation (9) is established as expressed by Equations (26) and (27).

$$\dot{z}_1 = g_1 z_1 + y \tag{26}$$

$$\dot{z}_2 = g_1 z_2 + Tr \tag{27}$$

Equations (28) and (29) are established by Laplace transformation on Equations (26) and (27).

$$z_1 = \frac{1}{s - g_1} y \tag{28}$$

$$z_2 = \frac{1}{s - g_1} Tr \tag{29}$$

Equations (28) and (29) are each a derivation equation for the regression vector and each correspond to the state variable filter. In addition, Equation (30) is introduced as an equation corresponding to Equation (17).

$$\dot{\Gamma} = -\lambda\Gamma + \begin{bmatrix} z_1 \\ z_2 \end{bmatrix}[z_1 \quad z_2] \tag{30}$$

$$= -\lambda\Gamma + \begin{bmatrix} z_1^2 & z_1 z_2 \\ z_1 z_2 & z_2^2 \end{bmatrix}$$

Equation (29) is sequentially calculated to obtain the matrix $\Gamma$. The frequency $\lambda$ corresponds to a cutoff frequency of a primary low-pass filter by Laplace transformation on Equation (30). As the frequency $\lambda$ is larger, a time for convergence of the matrix $\Gamma$ becomes shorter.

Substituting the results of Equations (25), (28), (29), and (30) in Equation (24) yields $\dot{\hat{\Theta}}$, and then integrating $\dot{\hat{\Theta}}$ yields the variable estimate vector $\hat{\Theta}$. The state setting $g_1$ is a value given in advance. The unknown parameters J and D are therefore identified from the variable estimate vector $\hat{\Theta}$.

For example, Equation (28) is provided for the first state amount calculator 73, and Equation (29) is provided for the second state amount calculator 74. In addition, Equation (30) is provided for the adaptive identification calculator 75. Results of Simulations by Estimated Inertial Load Value Calculating Method For the adaptive observer described above, an influence of a vibration disturbance and an influence of a modeling error were confirmed by simulation. Simulations were made on the assumption that the control subject is a rotary motor. Results of the respective simulation are described below.

(1) Influence of Vibrations in Torque Control Mode

The control subject is defined as a rigid body having the following characteristics.

True value [kgm$^3$] of inertia moment J: $0.263 \times 10^{-3}$
True value [–] of viscous friction coefficient D: 0.0001
Cutoff frequency $g_1$ of state variable filter: $-2\pi \times 100$
Initial value $\gamma$ of $\Gamma$: $=1.0 \times 10^{-6}$
Weighting factor $\lambda$: 1000

The control subject was accelerated and decelerated in 100 ms at a rated torque of 10%, and a 0% torque command in 200 ms was input to the control subject during the acceleration and deceleration. A rated torque of 0.1% (frequency: 10 Hz) was also input as a periodic disturbance to the control subject. In addition, a time until the error of estimation becomes 0 by increasing the weighting factor $\lambda$ from 1 to 1000 was confirmed by simulation.

Figure 8A:
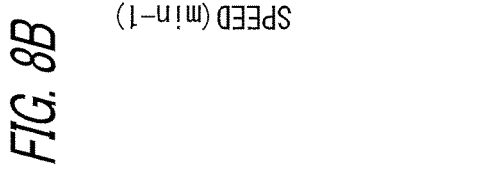
FIGS. 8A to 8D are graphs of results of a simulation made on the adaptive observer for the inertial load value calculator.
Figure 8B:
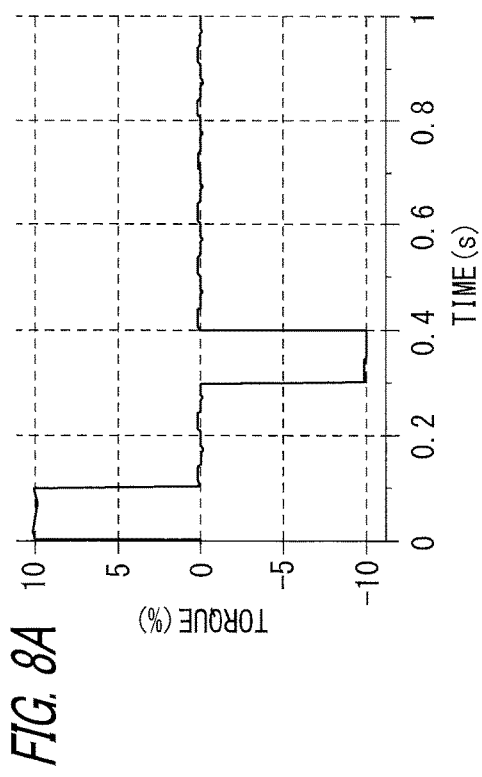
Figure 8C:
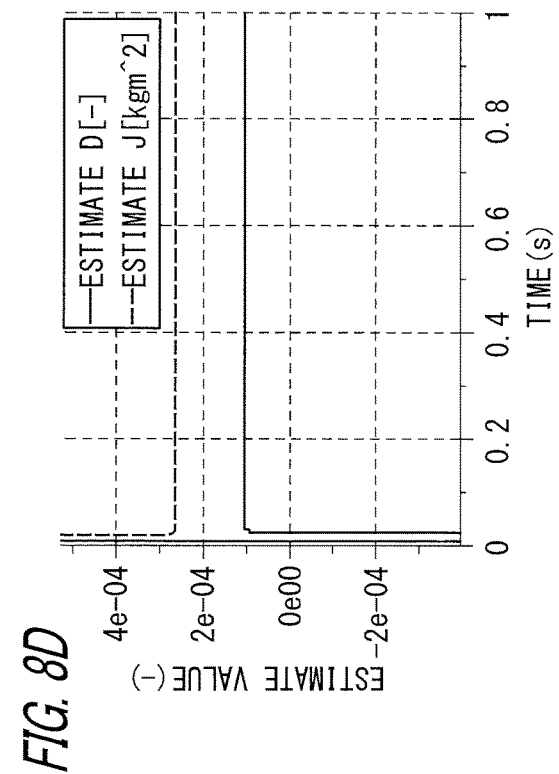
Figure 8D:
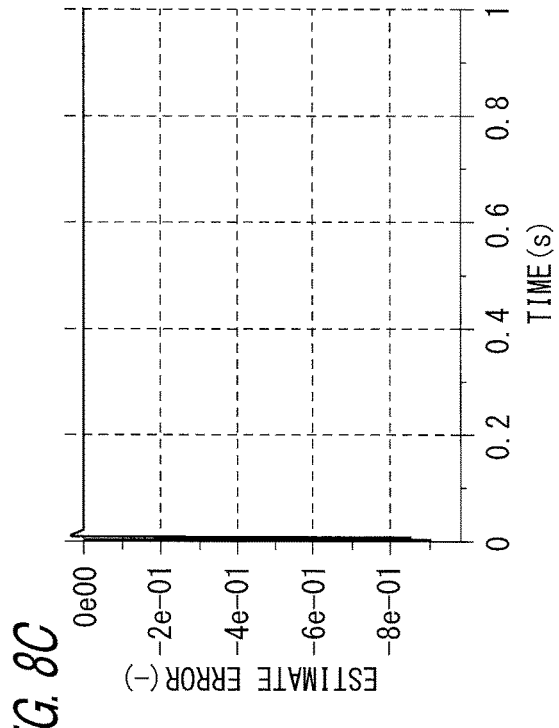

FIGS. 8A to 8D are graphs of results of the simulation. FIG. 8A shows a change in torque command. FIG. 8B shows a change in motor speed. FIG. 8C shows a change in error of estimation. FIG. 8D shows a change in estimate of a viscous friction coefficient (dotted line) and a change in estimate of an inertia moment (solid line). FIG. 8C is a plot of values corresponding to Equation (25).

As shown in FIG. 8C, the error of estimation becomes 0 at about 25 ms. As shown in FIG. 8D, after the error of estimation becomes 0, the estimated viscous friction coefficient is 0.0001, and the estimated inertia moment is $0.263 \times 10^{-3}$. As to the control subject, the true value of the viscous friction coefficient and the true value of the inertia moment are estimated correctly.

(2) Influence of Vibrations Due to Gain Balance in Position Control Mode

Typically, when a set inertia moment ratio to be used for calculation is smaller than a true value of an inertia moment ratio (i.e., an inertial load ratio) for a control subject (e.g., the motor 4, the drive subject 8), a balance between a position loop gain and a speed loop gain is lost, which can result in vibrations. A simulation was therefore made, in which the actual inertia moment ratio for the control subject was set at 1000% and the set inertia moment ratio was set at 0% (no load).

Figure 9B:
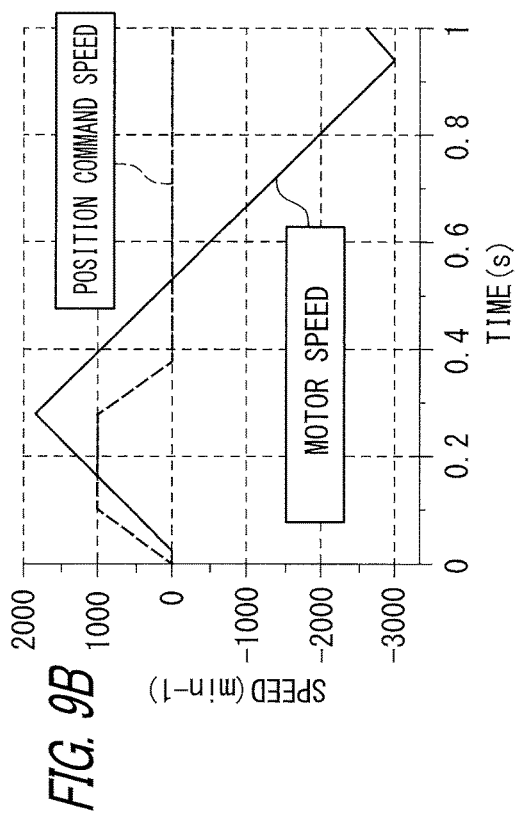
FIGS. 9A to 9D are graphs of results of a simulation made on the adaptive observer for the inertial load value calculator (an influence of vibrations due to a gain balance in a position control mode).
Figure 9D:
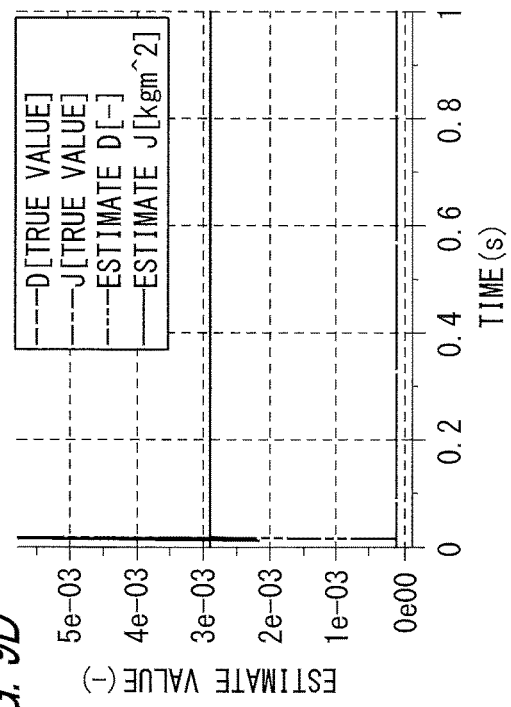
Figure 9A:
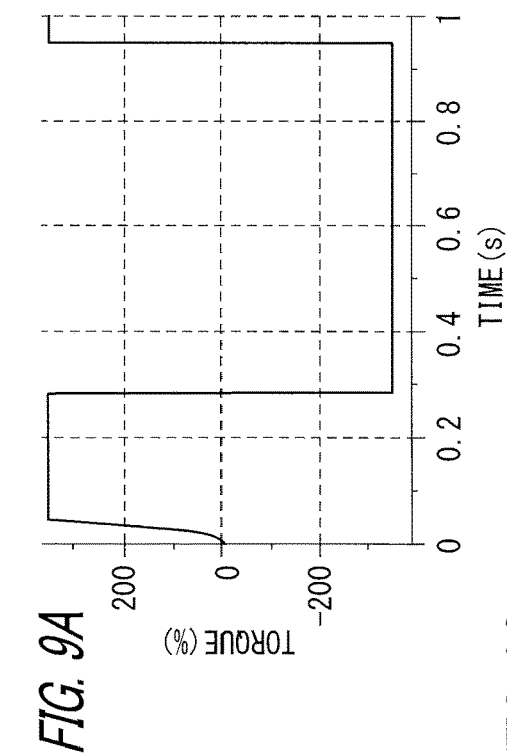
Figure 9C:
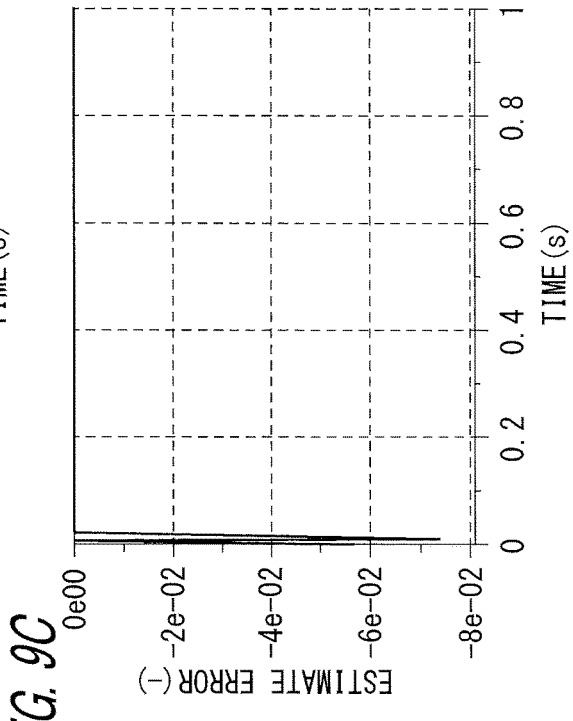
Figure 10A:
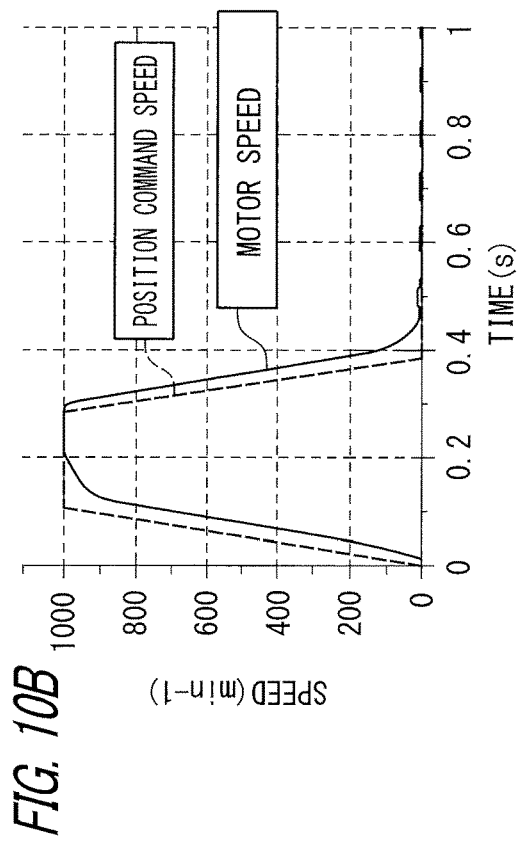
FIGS. 10A to 10D are graphs of results of a simulation made on the adaptive observer for the inertial load value calculator (an influence of a periodic disturbance in the position control mode).
Figure 10B:
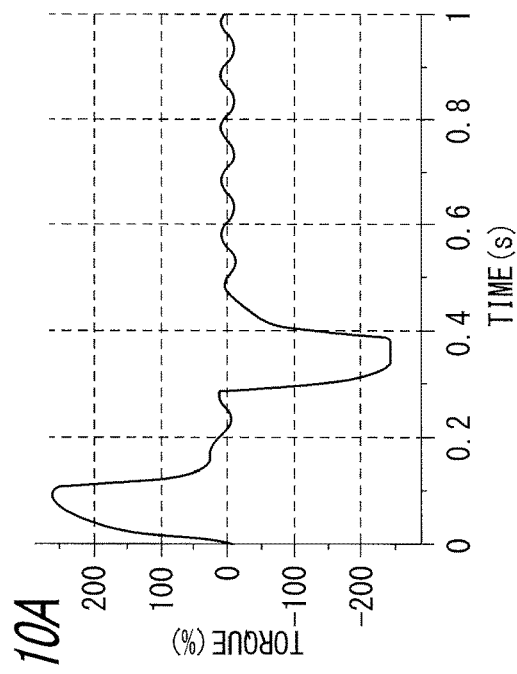
Figure 10C:
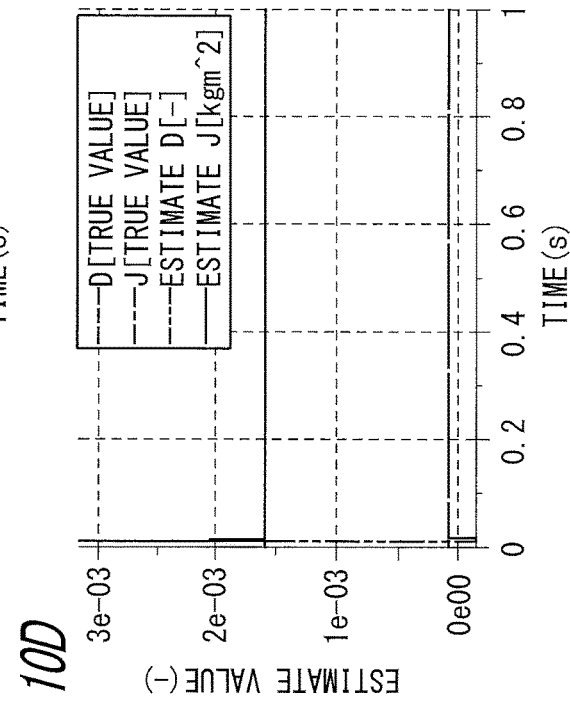
Figure 10D:
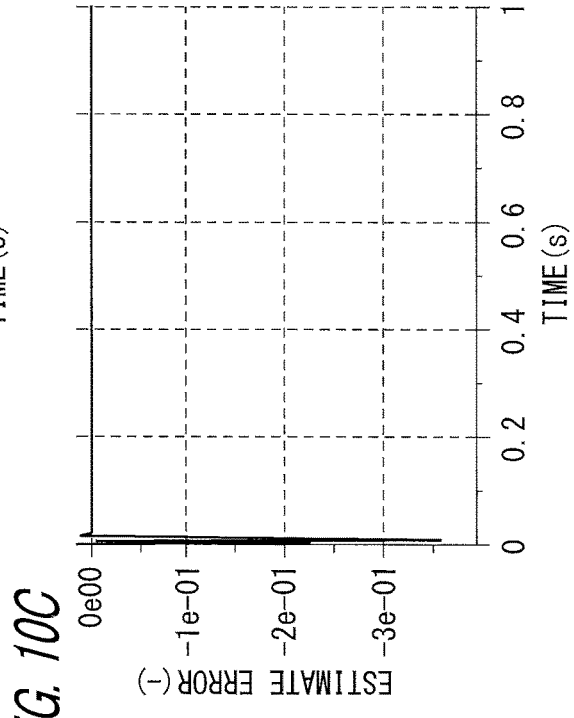

FIGS. 9A to 9D are graphs of results of the simulation. FIG. 9A shows a change in torque command. FIG. 9B shows a change in position command speed (broken line) and a change in motor speed (solid line). FIG. 9C shows a change in estimated deviation. FIG. 9D shows a change in true value of a viscous friction coefficient (broken line), a change in true value of an inertia moment (alternate long and short dashed line), a change in estimate of the viscous friction coefficient (chain double-dashed line), and a change in estimate of the inertia moment (solid line).

As shown in FIGS. 9A to 9D, the true value of the viscous friction coefficient D and the true value of the inertia moment J are estimated even when vibrations occur. In addition, a time required for a convergence of each estimate is about 25 ms, which is the same result as that in the torque control mode described above.

It can be therefore said that vibrations which can occur due to the gain balance exert no influence on the inertial load value estimating method by the adaptive observer.

(3) Influence of Periodic Disturbance in Position Control Mode

Even when the inertia moment ratio is set correctly, vibrations can occur due to external force. FIGS. 10A to 10D are graphs of results of a simulation in which each of the inertia moment ratio for the control subject and the set inertia moment ratio was set at 500% and a periodic disturbance at a rated torque of 50% (frequency: 10 Hz) was applied as an external force to the control subject.

As shown in FIGS. 10A to 10D, the true value of the viscous friction coefficient and the true value of the inertia moment are estimated even when the periodic disturbance is applied to the control subject. In addition, a time required for a convergence of each estimate is about 25 ms, which is the same result as that in the torque control mode described above.

It can be therefore said that the periodic disturbance applied to the control subject exerts no influence on the inertial load value estimating method by the adaptive observer.

(4) Influence of Modeling Error (Two-inertia Model)

Figure 11A:
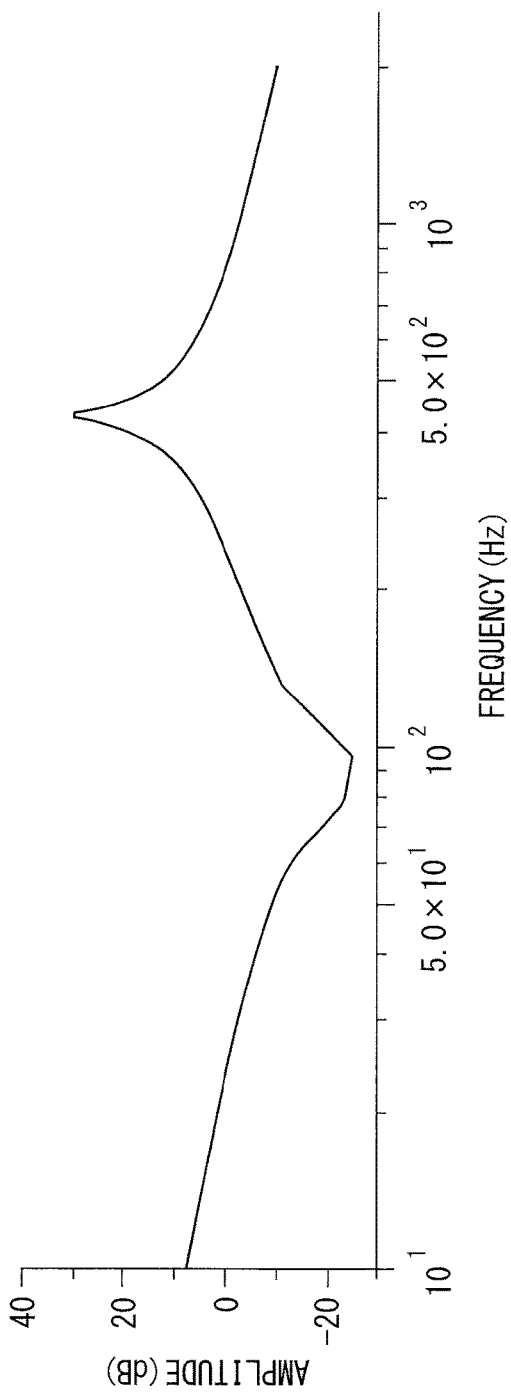
FIGS. 11A and 11B are graphs of frequency characteristics of a control subject (a two-inertia model) used for a simulation made on the adaptive observer for the inertial load value calculator.
Figure 11B:
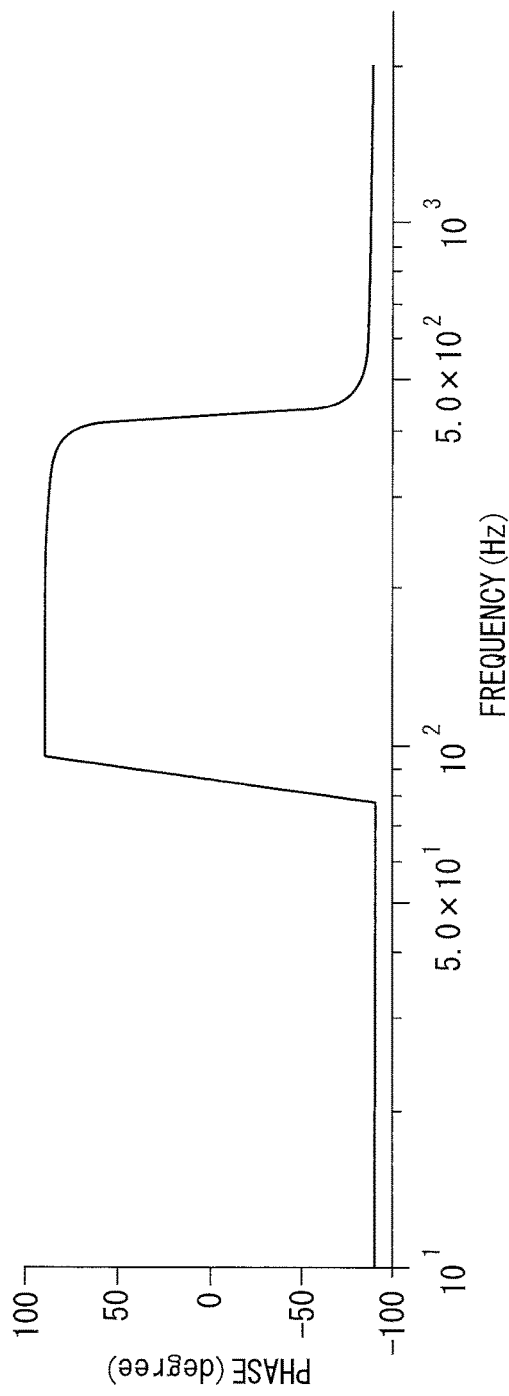
Figure 12A:
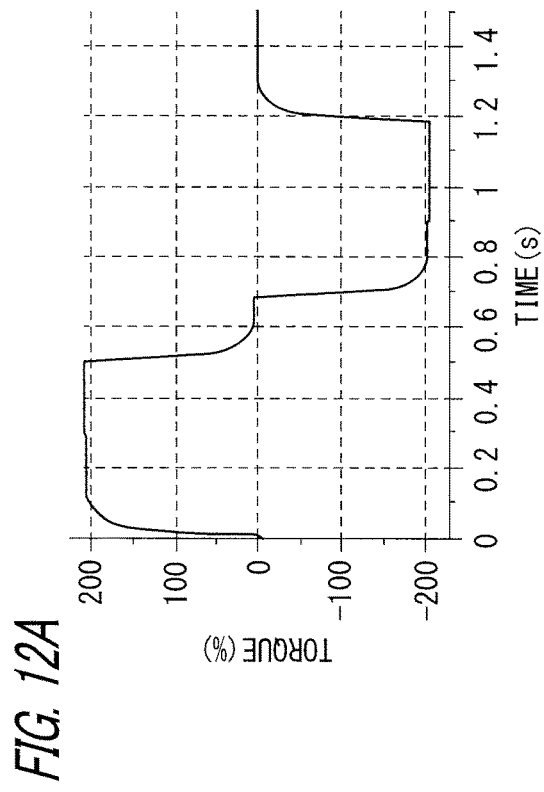
FIGS. 12A to 12D are graphs of results of a simulation made on the adaptive observer for the inertial load value calculator (an influence of a modeling error on the two-inertia model).
Figure 12B:
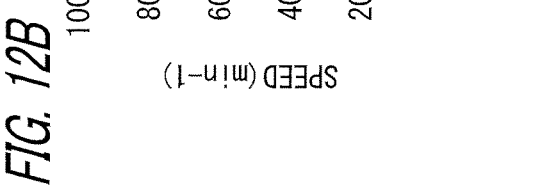
Figure 12C:
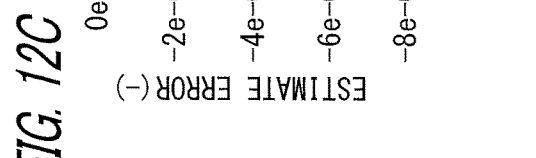
Figure 12D:
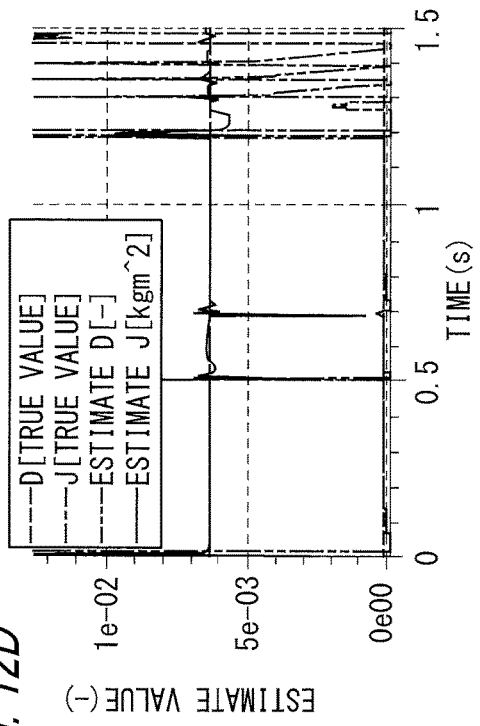

The simulations (1) to (3) were made on the assumption that the control subject is a rigid body. However, the control subject is not limited to a rigid body. A simulation was therefore made, in which the control subject was a two-inertia model having frequency characteristics shown in FIGS. 11A and 11B.

As shown in FIGS. 12A to 12D, almost all the true values are estimated except for the true value of the inertia moment. The estimation of the inertia moment is shifted at the timing of a change in speed. With regard to the viscous friction coefficient, moreover, the estimate is absolutely different from the true value.

It can be inferred from the above description that an influence of the modeling error mainly appears as an error of estimation of the viscous friction coefficient, but is not exerted on the estimation of the inertia moment so much. In order to confirm this inference, the same simulation was made on a three-inertia control subject and a four-inertia control subject.

(5) Influence of Modeling Error (Three-inertia Model)

Figures 13A, 13B:
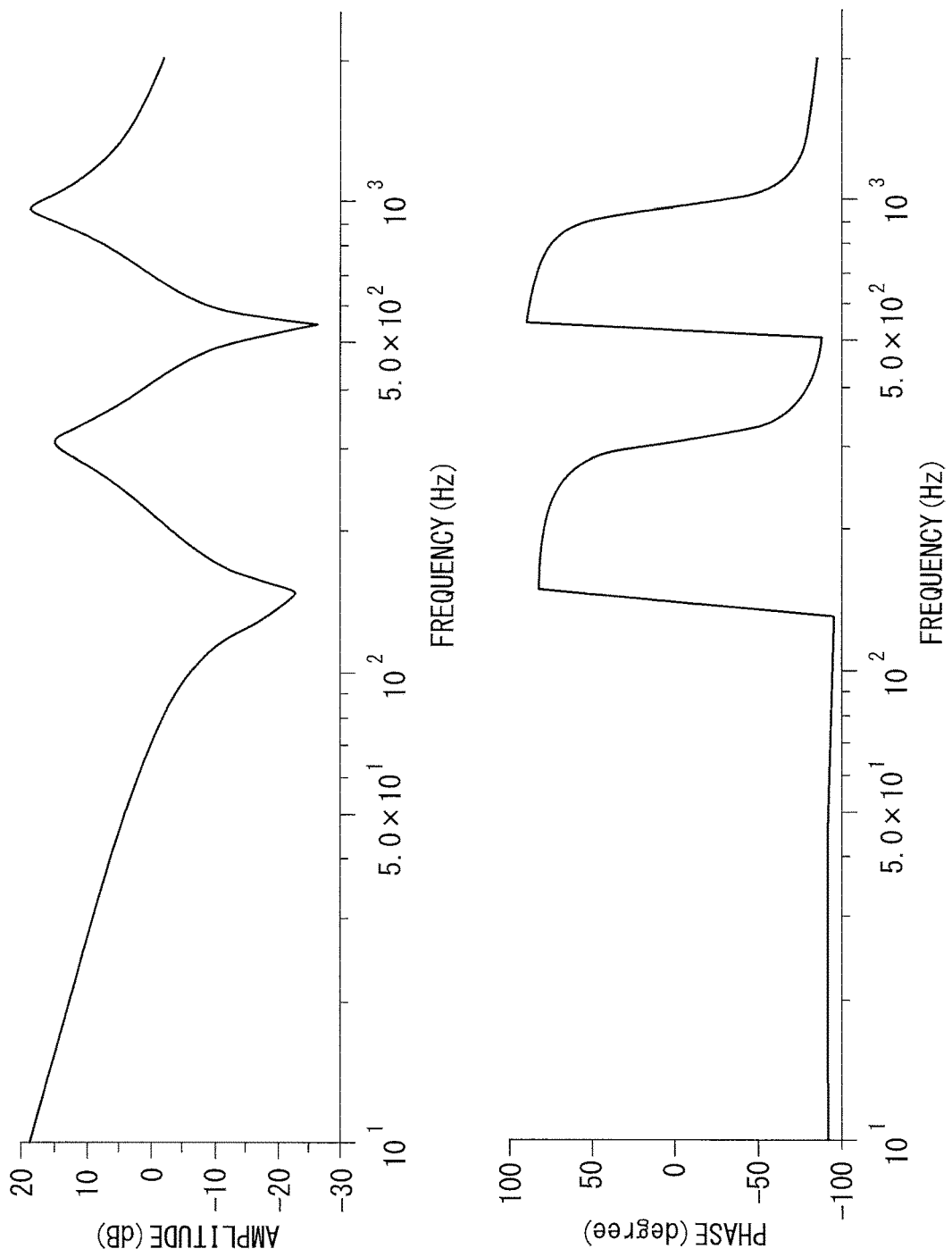
FIGS. 13A and 13B are graphs of frequency characteristics of a control subject (a three-inertia model) used for a simulation made on the adaptive observer for the inertial load value calculator.
Figure 14A:
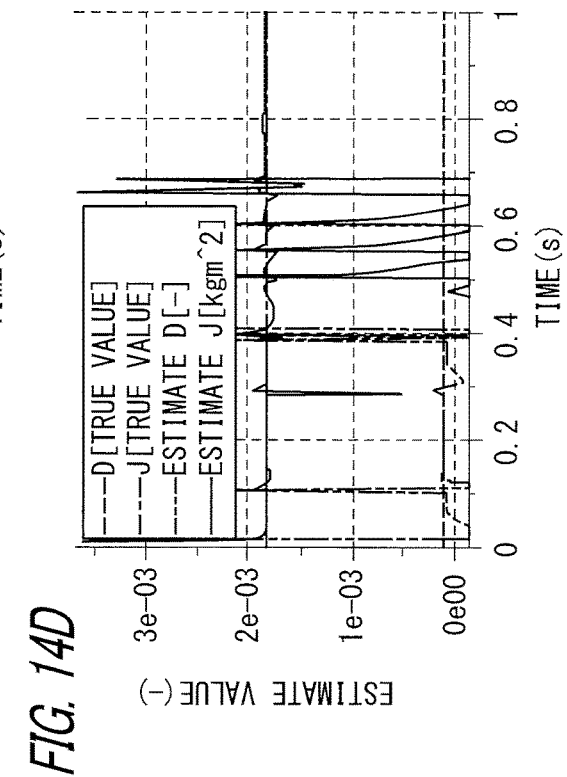
FIGS. 14A to 14D are graphs of results of the simulation made on the adaptive observer for the inertial load value calculator (an influence of a modeling error on the three-inertia model).
Figure 14B:
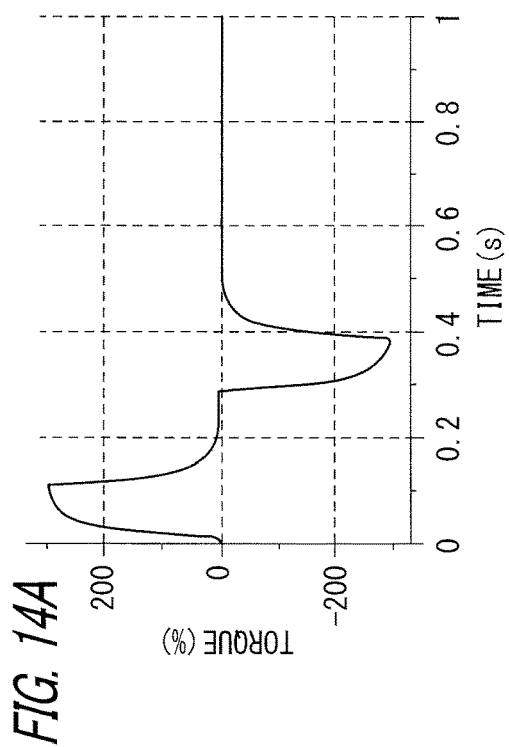
Figure 14C:
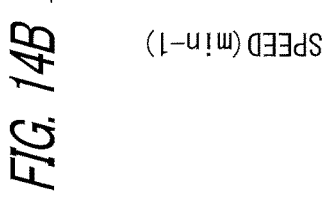
Figure 14D:
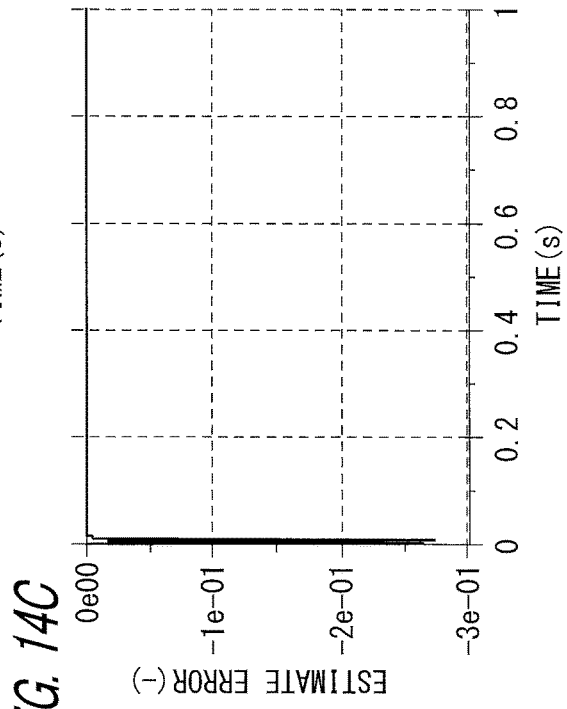

The simulation was made, in which the control subject was a three-inertia model having frequency characteristics shown in FIGS. 13A and 13B.

As shown in FIGS. 14A to 14D, almost all the true values are estimated except for true value of the inertia moment, as in the case of the two-inertia model. The estimation of the inertia moment is shifted at the timing of a change in speed. With regard to the viscous friction coefficient, moreover, the estimate is absolutely different from the true value.

(6) Influence of Modeling Error (Four-inertia Model)

Figure 15A:
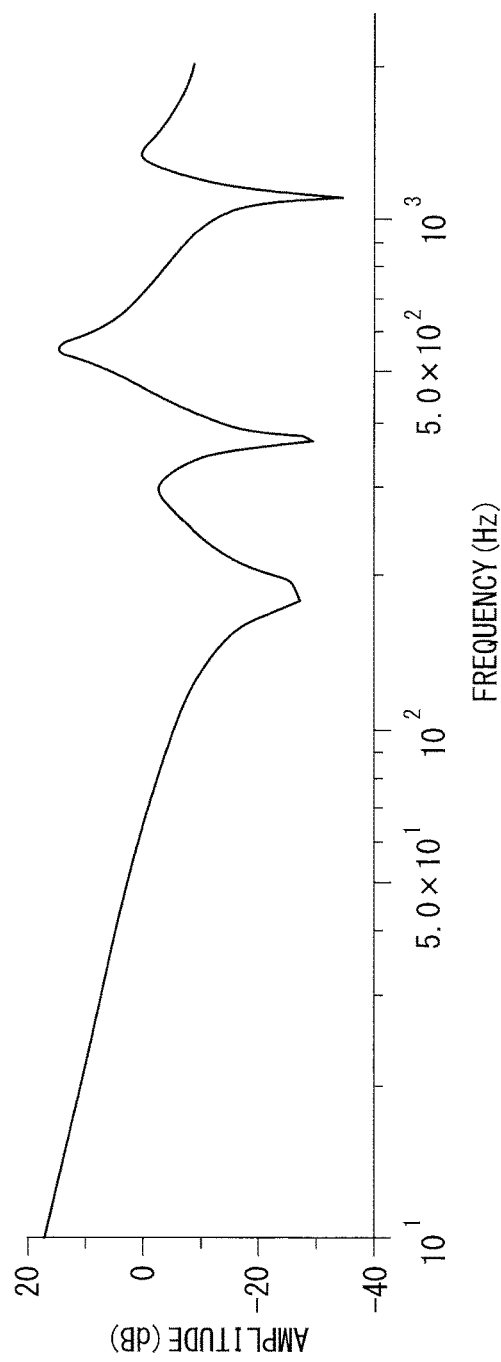
FIGS. 15A and 15B are graphs of frequency characteristics of a control subject (a four-inertia model) used for a simulation made on the adaptive observer for the inertial load value calculator.
Figure 15B:
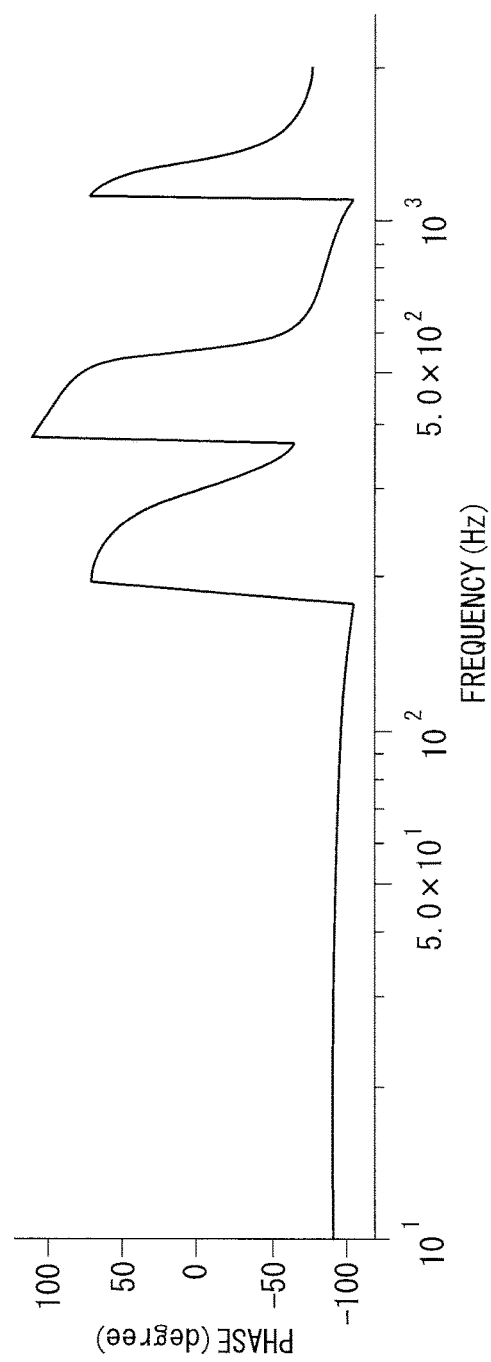
Figure 16B:
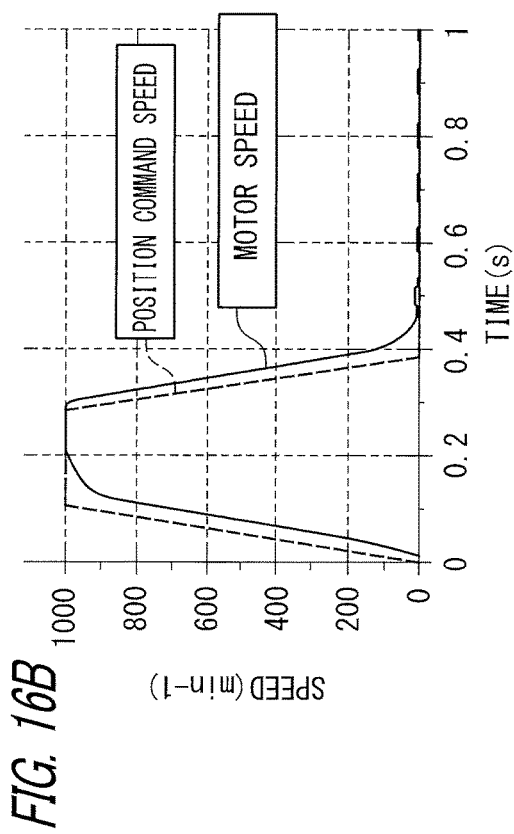
FIGS. 16A to 16D are graphs of results of the simulation made on the adaptive observer for the inertial load value calculator (an influence of a modeling error on the four-inertia model).
Figure 16D:
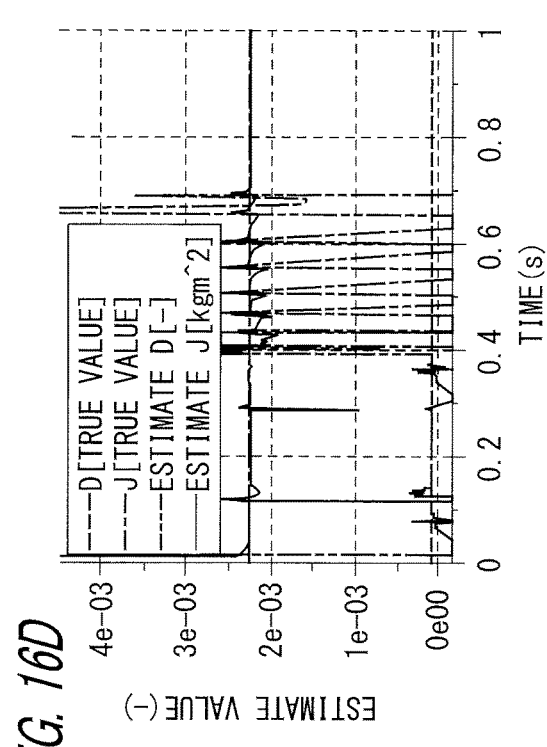
Figure 16A:
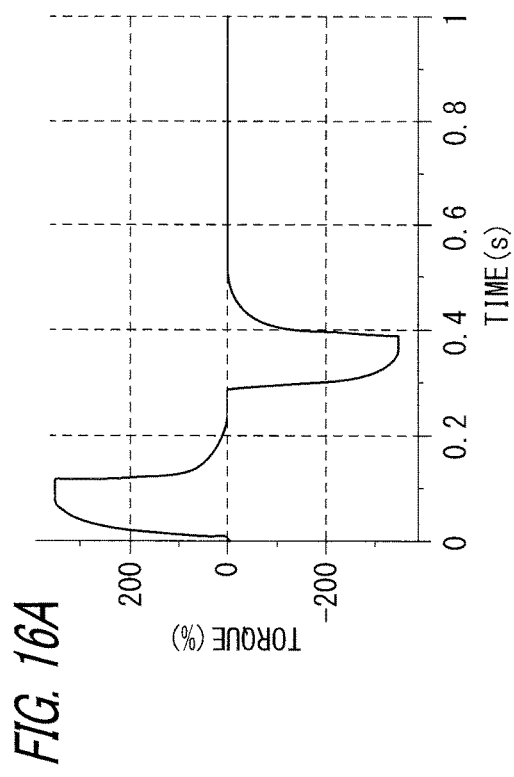
Figure 16C:
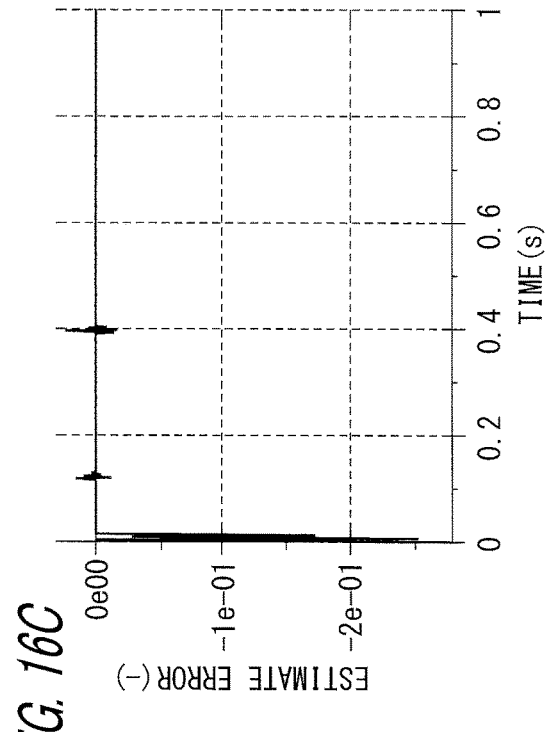
Figure 17A:
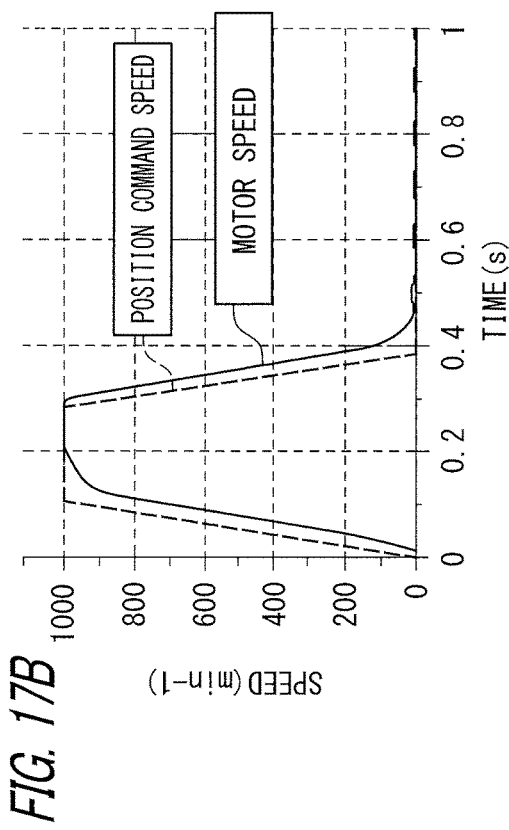
FIGS. 17A to 17D are graphs of results of another simulation made on the adaptive observer for the inertial load value calculator (the influence of the modeling error on the four-inertia model).
Figure 17B:
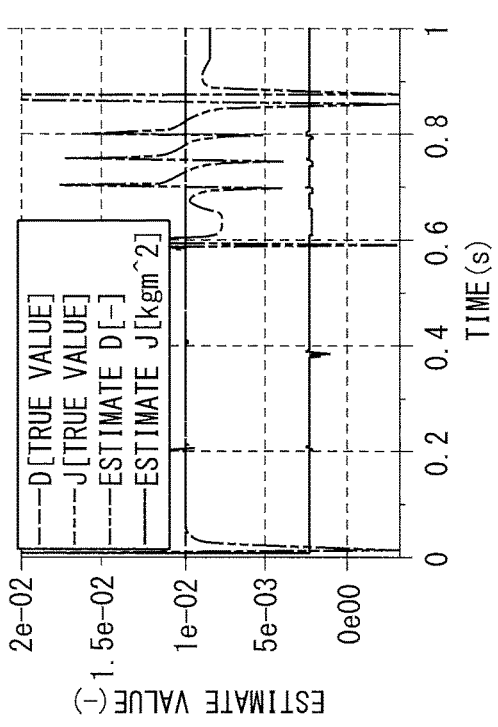
Figure 17C:
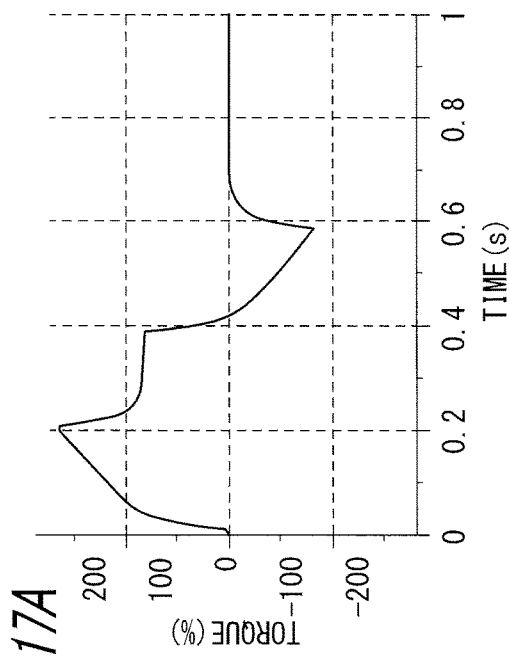
Figure 17D:
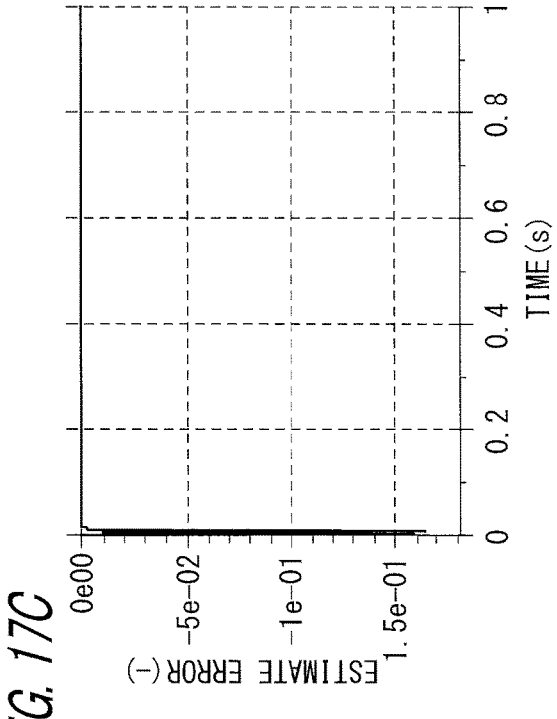
Figure 20A:
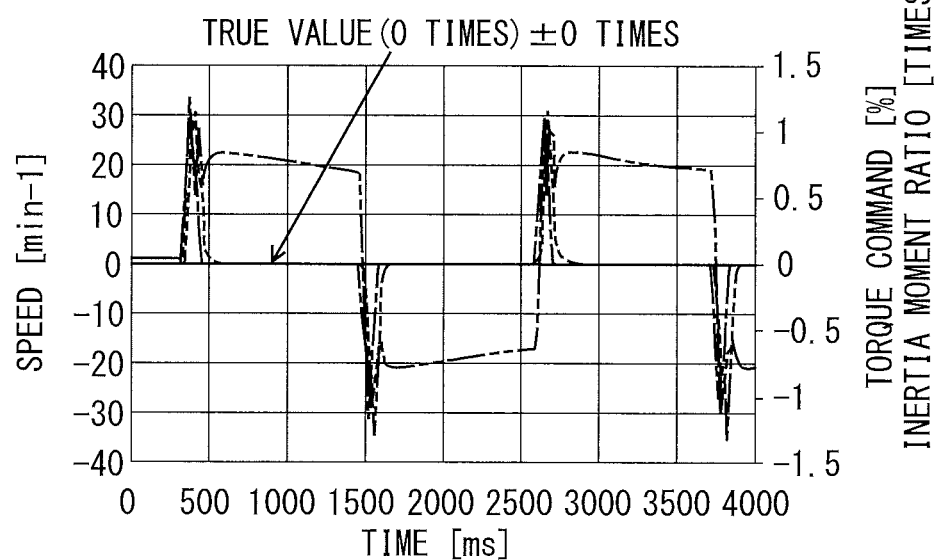
FIGS. 20A and 20B are graphs of results (load: no load, control: position control, mode: output correction disable mode) of the experimental evaluation on the adaptive observer for the inertial load value calculator.
Figure 20B:
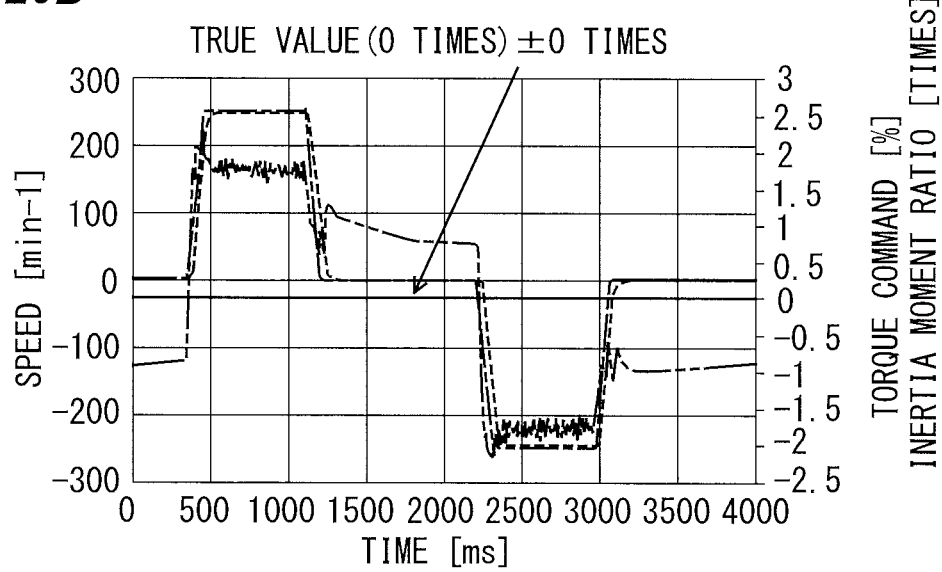
Figure 21A:
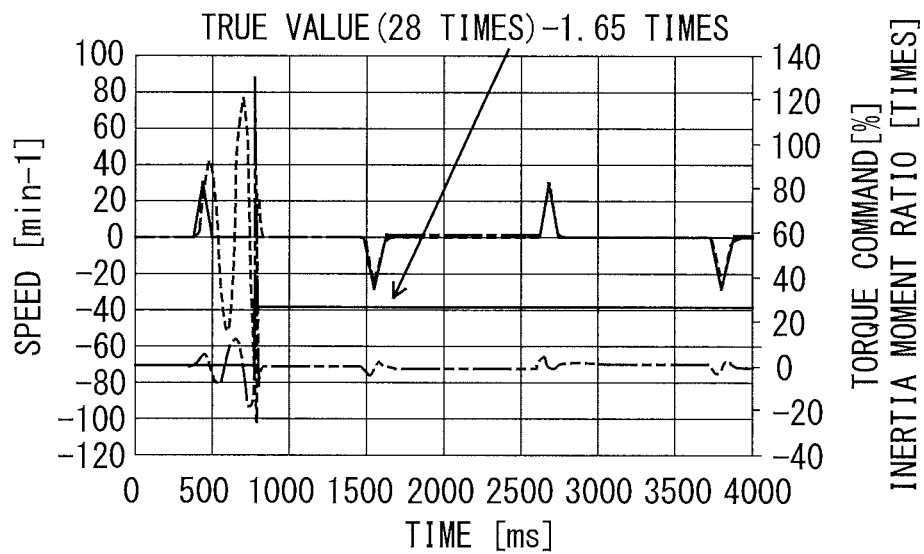
FIGS. 21A and 21B are graphs of results (load: 28-times rigid load, control: position control, mode: output correction disable mode) of the experimental evaluation on the adaptive observer for the inertial load value calculator.
Figure 21B:
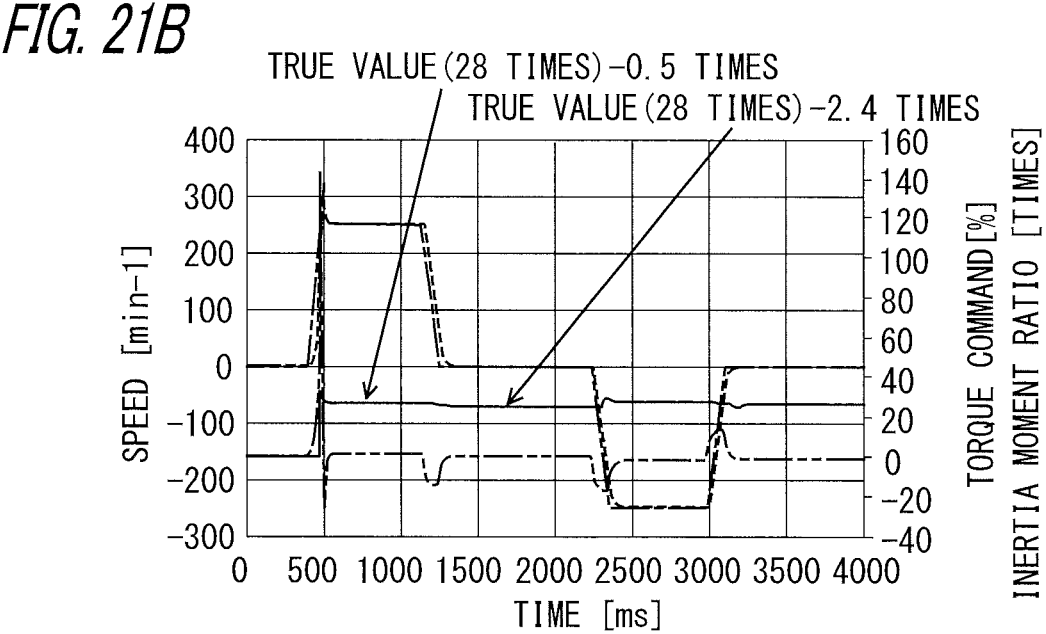
Figure 22A:
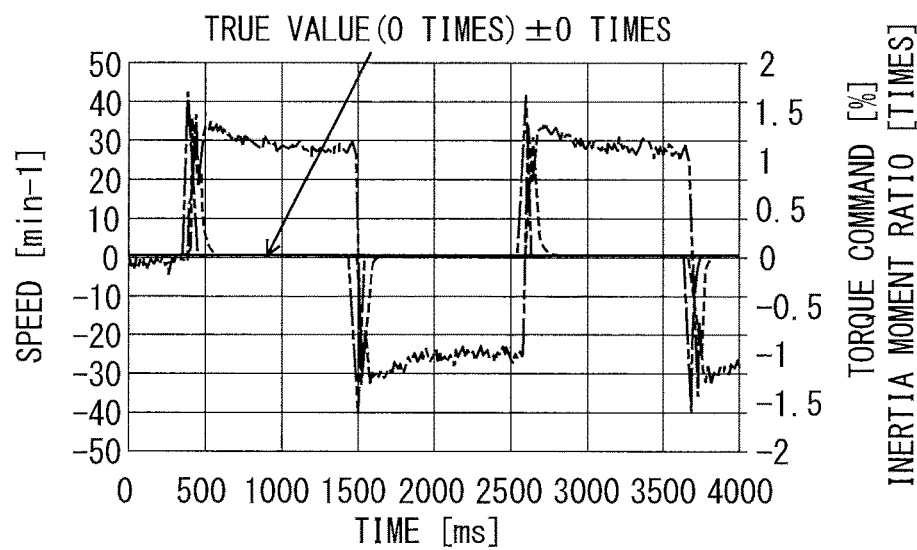
FIGS. 22A and 22B are graphs of results (load: no load, control: position control, mode: output correction enable mode) of the experimental evaluation on the adaptive observer for the inertial load value calculator.
Figure 22B:
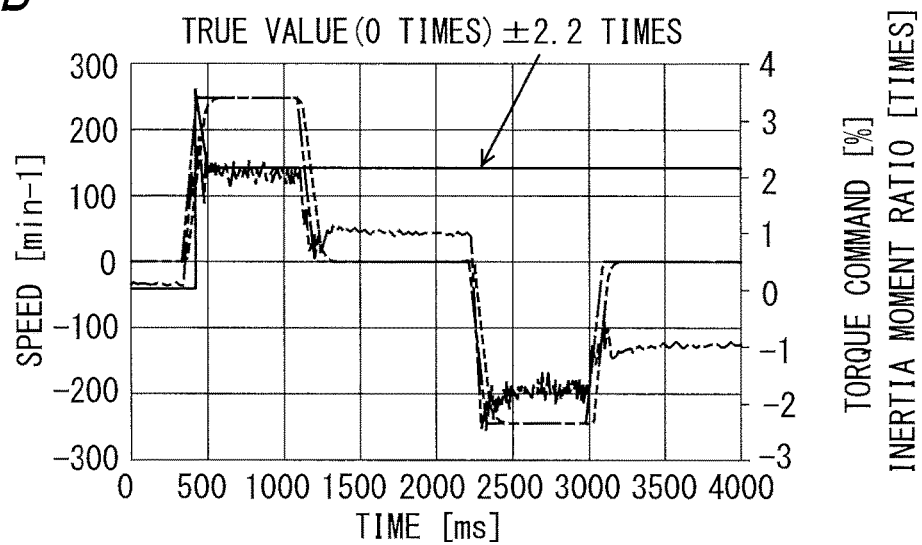
Figure 23A:
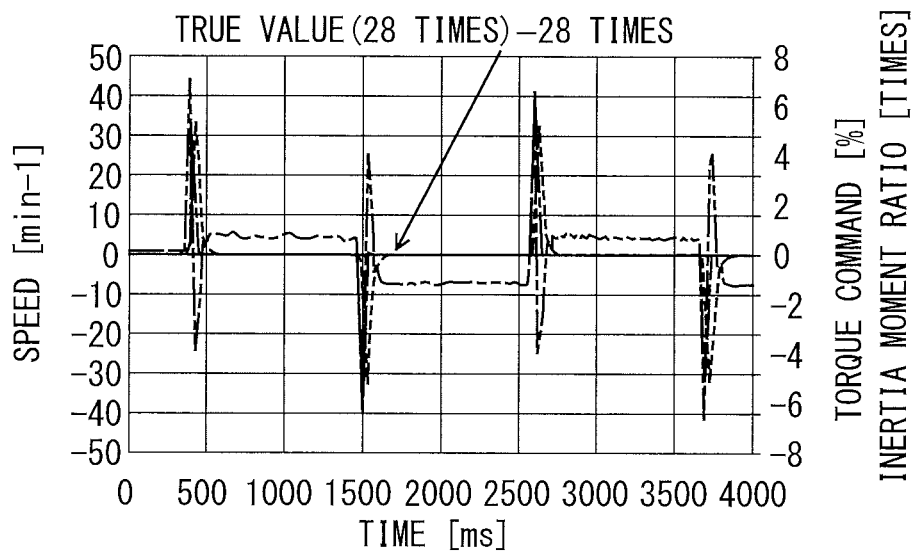
FIGS. 23A and 23B are graphs of results (load: 28-times rigid load, control: position control, mode: output correction enable mode) of the experimental evaluation on the adaptive observer for the inertial load value calculator.
Figure 23B:
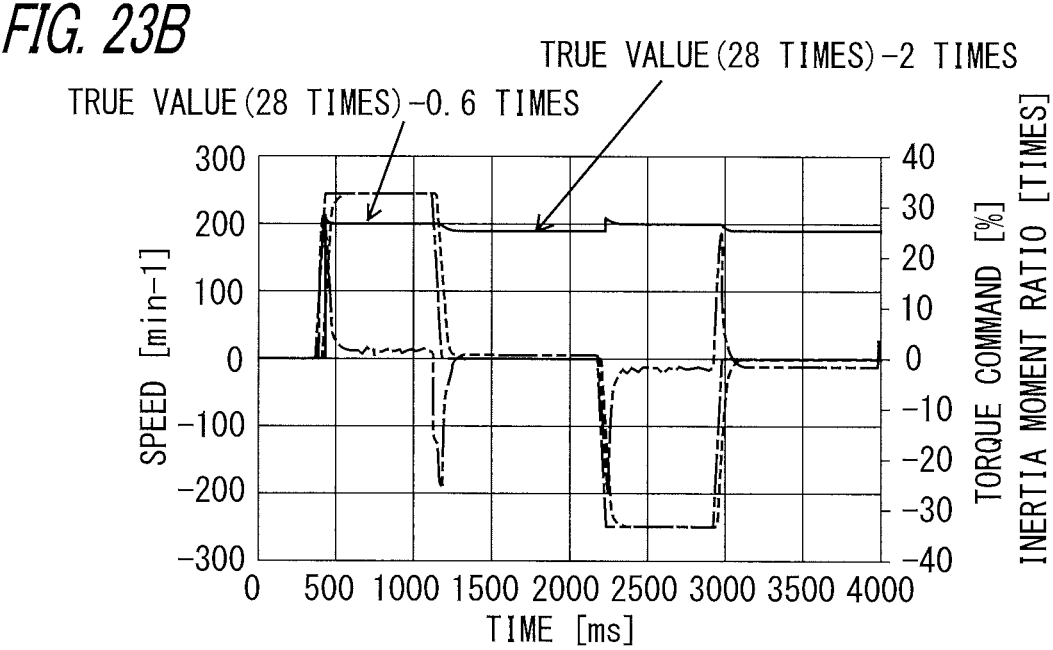

The simulation was made, in which the control subject was a four-inertia model having frequency characteristics shown in FIGS. 15A and 15B.

As shown in FIGS. 16A to 16D, almost all the true values are estimated except for true value of the inertia moment, as in the case of the two-inertia model. The estimation of the inertia moment is shifted at the timing of a change in speed. With regard to the viscous friction coefficient, moreover, the estimate is absolutely different from the true value.

FIGS. 17A to 17D are graphs of results of a simulation in which the viscous friction coefficient was changed from 0.0001 to 0.01 with regard to the control subject having the frequency characteristics shown in FIGS. 15A and 15B. In consideration of torque saturation, the command acceleration and deceleration time was also changed from 100 ms to 200 ms. As shown in FIGS. 17A to 17D, even when the viscous friction coefficient is changed, the estimate of the inertia moment does not almost change as compared with the estimate shown in FIGS. 16A to 16D, but the estimate of the viscous friction coefficient approaches the true value. It can be inferred that this is because the influence of the viscous friction coefficient becomes relatively larger than the influence of the modeling error.

(7) Influence of Modeling Error (Conclusion)

As described above, it can be said from the results of the simulation on the two-inertia model, three-inertia model, and four-inertia model that the influence of the modeling error mainly appears as the error of estimation of the viscous friction coefficient, but is not exerted on the estimation of the inertia moment so much. The inertia moment, that is, the inertial load value is a variant of a dimension of a speed, whereas the viscous friction coefficient is a variant of a dimension of an acceleration. In calculation, the inertia moment converges prior to the viscous friction coefficient, and a modeling error concentrates on the viscous friction coefficient converging later. As a result, the error of estimation of the inertia moment becomes smaller than the error of estimation of the viscous friction coefficient, so that the inertia moment is estimated accurately. In the motor control device 100, the inertial load value calculator 70, more specifically, the estimated inertial load value calculator 71 calculates the estimated inertial load value $J_E$ and the estimated viscous resistance coefficient $D_E$, based on the motor actual output X and the motor output command Tr, such that the error of estimation of the estimated inertial load value $J_E$ becomes smaller than the error of estimation of the estimated viscous resistance coefficient $D_E$.

Results of Experiment by Estimated Inertial Load Value Calculating Method

Performance evaluation by experiment using an estimation algorithm of an inertial load value calculated with the adaptive observer was made on an actual machine equipped with a discrete rotary motor (inertial load ratio: 0 times) and an actual machine equipped with a rotary motor to which a rigid load (inertial load ratio: 28 times) is coupled. Specifically, evaluation was made on operating conditions shown in FIG. 18 in a situation in which an output correction value calculator 80 is enabled (the output correction enable mode) and in a situation in which the output correction value calculator 80 is disabled (the output correction disable mode), in the speed control and the position control. FIG. 18 is a table of the operating conditions in the position control. In the situation in which the output correction value calculator 80 is disabled, an estimated inertia moment calculated with the adaptive observer was reflected on an inertia moment to update a speed loop gain. A soft-start acceleration time and a soft-start deceleration time were respectively set at 1000 ms and 5000 ms.

FIG. 19 is a table of average estimated inertia moment ratios under the respective conditions. In this experiment, a section, in which an inertia moment ratio is 0%, before the start of estimation was excluded in averaging. Also, in this experiment, results of estimation were subjected to an averaging process. Specifically, an average inertia moment ratio was determined using only values that are less than a first threshold value set based on the error of estimation of the adaptive observer and are more than a second threshold value set based on changes in motor speed and torque, with respect to results of estimation every 10 ms. If the operating conditions are not satisfied in all the 10-ms sections, each of the actual machines was adjusted to output a 10-ms inertia moment ratio.

FIGS. 20A to 23B each show a feedback speed (broken line), a command speed (alternate long and short dashed line), a torque command (chain double-dashed line), and an inertia moment ratio (solid line).

As shown in the table of FIG. 19 as well as the graphs of FIGS. 20A to 23B, generally favorable inertia moment estimating accuracy was achieved except for the minute operation. It was also found that the inertia moment estimating accuracy does not depend on whether the output correction is enabled.

As described above, applying the adaptive observer to the control subject model illustrated in FIG. 7 causes the motor control device 100 to accurately calculate the estimated inertial load value $J_E$ in a relatively short time.

Features

The features of the motor control device 100 and motor control method are summarized as follows.

(1) The estimated inertial load value calculator 71 calculates the estimated inertial load value $J_E$ with the adaptive observer, based on the motor output command Tr and the motor actual output X. This configuration therefore causes the estimated inertial load value $J_E$ to follow the actual load level of the motor 4 in a relatively short time. According to this configuration, calculating the inertial load value $J_0$ based on the estimated inertial load value $J_E$ thus causes the motor output command Tr to follow the actual load level of the motor 4 in a relatively short time. In other words, the motor control device 100 and the motor control method enhance stability in motor control.

According to the motor control device 100, for example, the recovery of control stability and disturbance response characteristics by the recovery of a gain balance between a position loop and a speed loop is expected in position control that employs a position command as the external command 2A. In addition, the recovery of command followability is expected in speed control that employs a speed command as the external command 2A.

(2) The motor control device 100 further includes the output correction value calculator 80 to calculate the output correction value Tc, based on the motor actual output X and the motor output command Tr. The output command calculator 60 includes: the first output command calculator 61 to calculate the output command, based on the motor acceleration command A and the inertial load value $J_0$; and the second output command calculator 62 to calculate the motor output command Tr, based on the output command and the output correction value Tc. According to the motor control device 100 and the motor control method, the output command T is corrected based on the motor output command Tr and the motor actual output X. This configuration therefore causes the motor output command Tr to follow the actual load level of the motor 4. This configuration thus further enhances the stability in motor control.

(3) According to the motor control device 100 and the motor control method, the output correction value calculator 80 estimates the disturbance to calculate the output correction value Tc. This configuration therefore enhances accuracy in calculating the output correction value Tc.

(4) According to the motor control device 100, the inertial load value changer 72 changes the inertial load value $J_0$, based on the estimated inertial load value $J_E$. This configuration therefore causes the inertial load value $J_0$ to reliably follow the actual load level of the motor 4.

(5) The inertial load value changer 72 changes the inertial load value $J_O$, based on the reference inertial load range and the estimated inertial load value $J_E$. According to this configuration, setting the reference inertial load range in accordance with the specifications of the motor 4 therefore causes the reference inertial load range of the motor 4 to follow the actual load level of the motor 4. This configuration thus further enhances the stability in motor control.

(6) The inertial load value changer 72 increases the inertial load value $J_O$ when the estimated inertial load value $J_E$ is larger than the upper limit value $R_U$ of the reference inertial load range. This configuration therefore causes the reference inertial load range to reliably follow the actual load level of the motor 4 even when the reference inertial load range of the motor 4 is lower than the actual load level of the motor 4. This configuration thus more reliably enhances the stability in motor control.

(7) The inertial load value changer 72 increases the inertial load value $J_O$ with the estimated inertial load value $J_E$ when the estimated inertial load value $J_E$ is larger than the upper limit value $R_U$ of the reference inertial load range. This configuration therefore achieves a change in inertial load value $J_O$ without stepwise calculation of the inertial load value $J_O$ in increasing the inertial load value $J_O$. This configuration thus improves a processing speed in calculating the inertial load value $J_O$.

(8) The inertial load value changer 72 decreases the inertial load value $J_O$ when each of the reference inertial load value $J_M$ and the estimated inertial load ratio $R_E$ is smaller than a second inertial load ratio. This configuration therefore causes the reference inertial load range to reliably follow the actual load level of the motor 4 even when the reference inertial load range of the motor 4 is higher than the actual load level of the motor 4. This configuration thus more reliably enhances the stability in motor control.

(9) The inertial load value changer 72 decreases the inertial load value $J_O$ with the estimated inertial load value $J_E$ when each of the reference inertial load value $J_M$ and the estimated inertial load ratio $R_E$ is smaller than the second inertial load ratio. This configuration therefore achieves a change in inertial load value without stepwise calculation of the inertial load value $J_O$ in decreasing the inertial load value $J_O$. This configuration thus improves a processing speed in calculating the inertial load value $J_O$.

(10) The adaptive identification calculator 75 calculates the estimated inertial load value $J_E$, based on the first state amount and the second state amount. This configuration therefore enhances accuracy in estimating the inertial load value $J_O$.

(11) The inertial load value calculator 70 calculates the estimated inertial load value $J_E$ without using the motor acceleration command A and the command upstream from the motor acceleration command A. This configuration therefore causes the calculation of the estimated inertial load value $J_E$ to be less susceptible to an influence of input to the motor control device 100. This configuration thus enhances the followability of the estimated inertial load value $J_E$ to the actual load level of the motor 4.

(12) The inertial load value $J_O$ includes the inertia moment. This configuration thus enhances the follow-up performance in a rotary-drive motor control.

Second Embodiment

With reference to FIGS. 24 to 26B, a description will be given of a motor control device 200 according to a second embodiment. The motor control device 200 has the same configurations as those of the motor control device 100 except for the output correction value calculator 80 and the inertial load value changer 72. In the second embodiment, therefore, configurations having substantially the same functions as the configurations described in the first embodiment are denoted with the same reference signs, and the detailed description thereof will not be given here for the sake of simplification.

Figure 24:
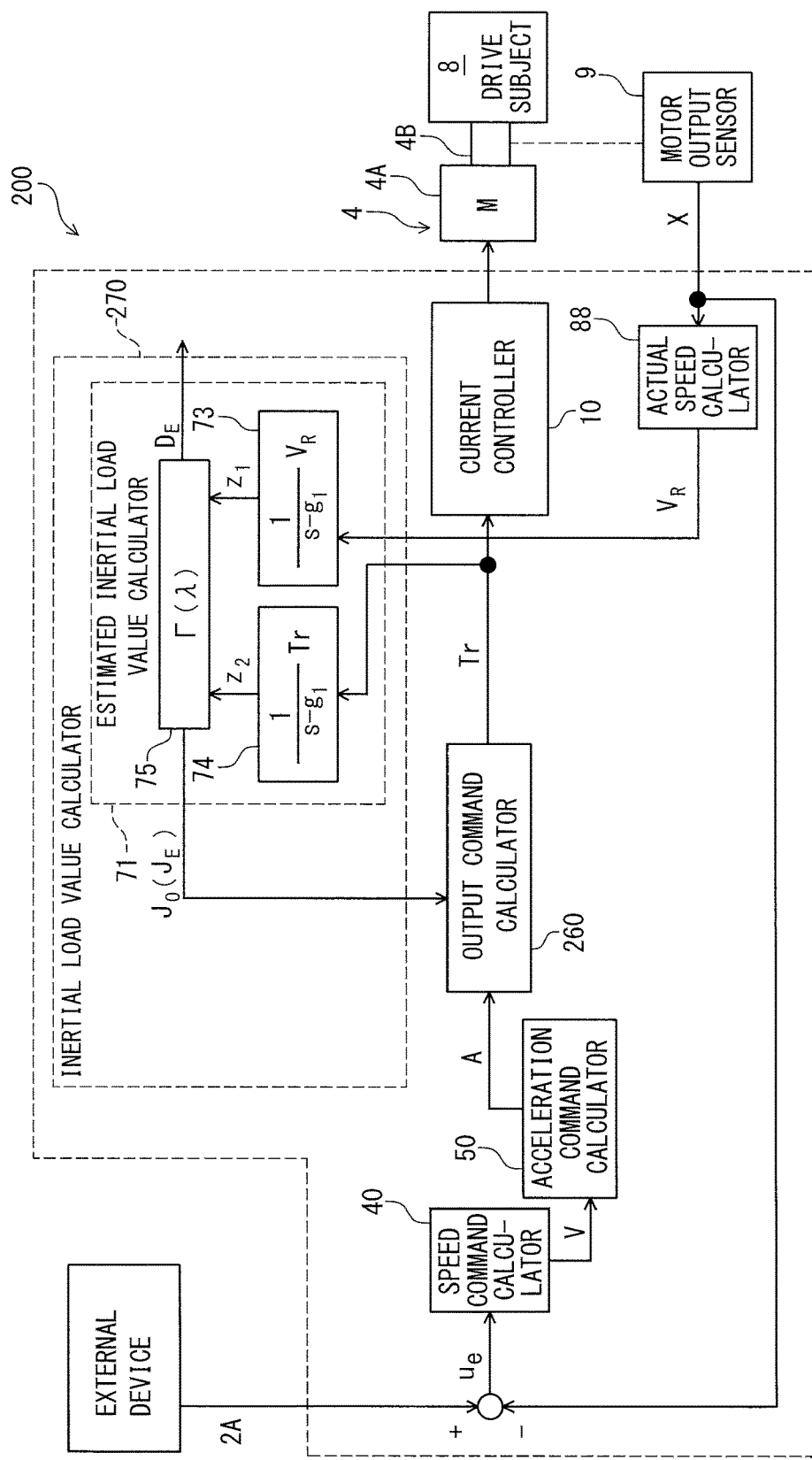
FIG. 24 is a block diagram of a motor control device according to a second embodiment.

As illustrated in FIG. 24, the motor control device 200 has configurations substantially the same as those of the motor control device 100 in the output correction disable mode. Specifically, the motor control device 200 includes the position deviation calculator 30, the speed command calculator 40, the acceleration command calculator 50, an output command calculator 260, and an inertial load value calculator 270. The motor control device 200 is the same as the motor control device 100 from which the output correction value calculator 80 and the inertial load value changer 72 are omitted.

Hence, the inertial load value calculator 270 calculates the inertial load value $J_O$ by outputting the estimated inertial load value $J_E$ as the inertial load value $J_O$ to the output command calculator 260. Specifically, the inertial load value calculator 270 stores the estimated inertial load value $J_E$ calculated by the estimated inertial load value calculator 71, in a memory 22 as the inertial load value $J_O$, in place of the processing by the inertial load value changer 72. The output command calculator 260 calculates the motor output command Tr, based on the inertial load value $J_O$ (=the estimated inertial load value $J_E$) and a motor acceleration command A.

Figure 25:
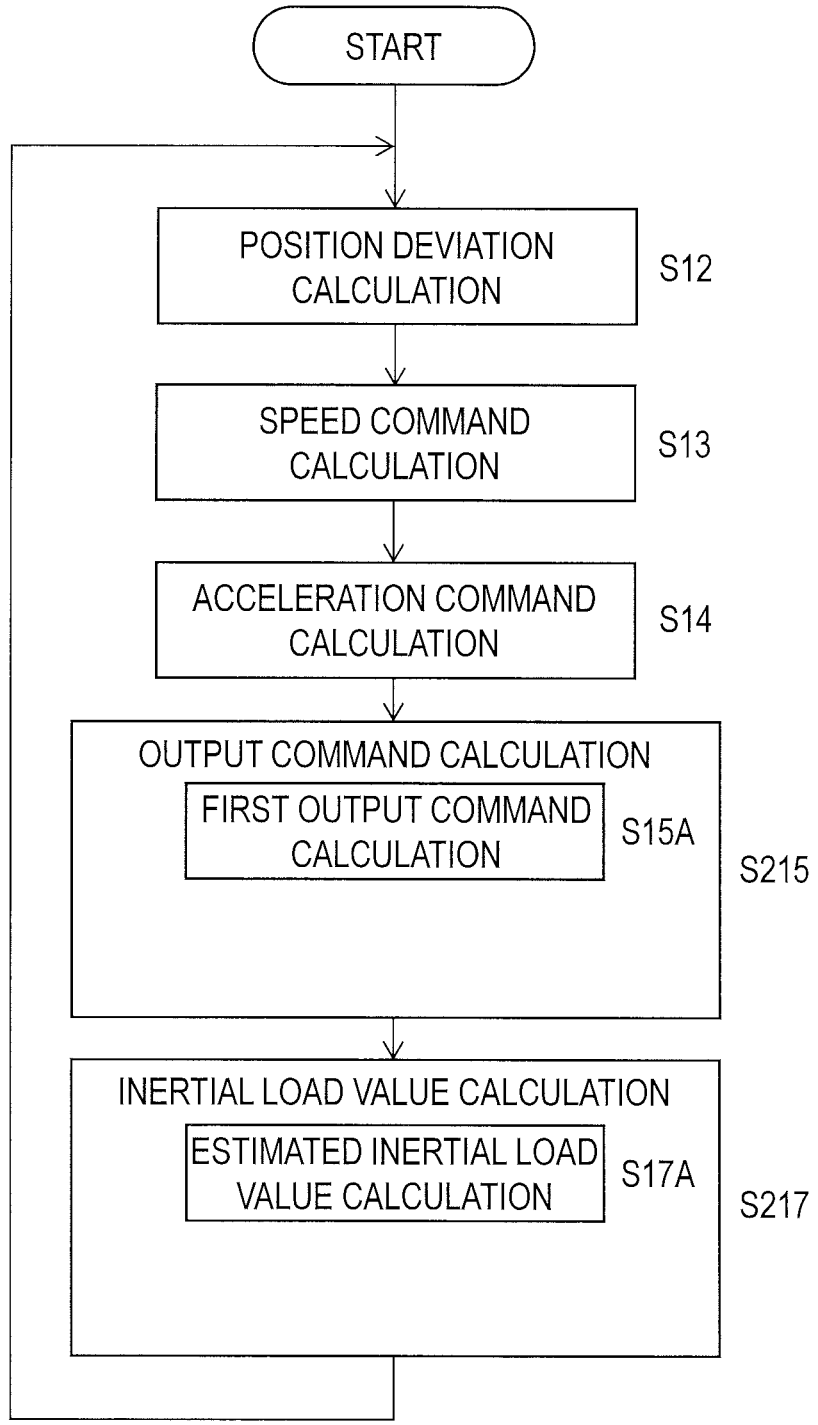
FIG. 25 is a flowchart of a motor control method to be performed by the motor control device illustrated in FIG. 24.

As illustrated in FIG. 25, a motor control method according to the second embodiment includes the position deviation calculating step S12, the speed command calculating step S13, the acceleration command calculating step S14, an output command calculating step S215, and an inertial load value calculating step S216. The motor control method according to the second embodiment is different from the motor control method according to the first embodiment illustrated in FIGS. 5 and 6 in that steps other than the steps described above are omitted from the motor control method according to the second embodiment. Specifically, the output command calculating step S215 corresponds to the output command calculating step S15 from which the second output command calculating step S15B is omitted. In addition, the inertial load value calculating step S217 corresponds to the inertial load value calculating step S17 from which the inertial load value changing step S17B is omitted.

In the output command calculating step S215, more specifically, in a first output command calculating step S15A, the output command calculator 260 calculates the motor output command Tr, based on the inertial load value $J_O$ and the motor acceleration command A. In the inertial load value calculating step S217, on the other hand, the inertial load value calculator 270 calculates the estimated inertial load value $J_E$ with the adaptive observer, based on a motor actual output X and the motor output command Tr, and also calculates the inertial load value $J_O$, based on the estimated inertial load value $J_E$. Specifically, the inertial load value calculating step S217 involves calculating the inertial load value $J_O$ by outputting the estimated inertial load value $J_E$ as the inertial load value $J_O$ from the inertial load value calculator 270 to the output command calculator 260. In the inertial load value calculating step S217, the memory 22 stores therein, as the inertial load value $J_O$, the estimated inertial load value $J_E$ calculated in an estimated inertial load value calculating step S17A. In the output command calculating step S215, more specifically, in the first output command calculating step S15A, in other words, the output command calculator 260 calculates the motor output command Tr, based on the estimated inertial load value $J_E$ and the motor acceleration command A.

Figure 26A:
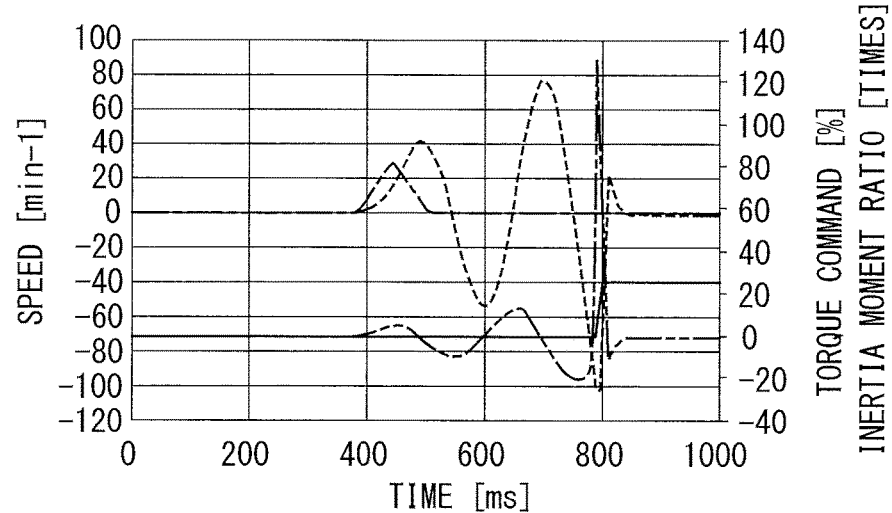
FIG. 26A is a graph of results (load: 28-times rigid load, control: position control, mode: output correction disable mode) of experimental evaluation on an adaptive observer for an inertial load value calculator.
Figure 26B:
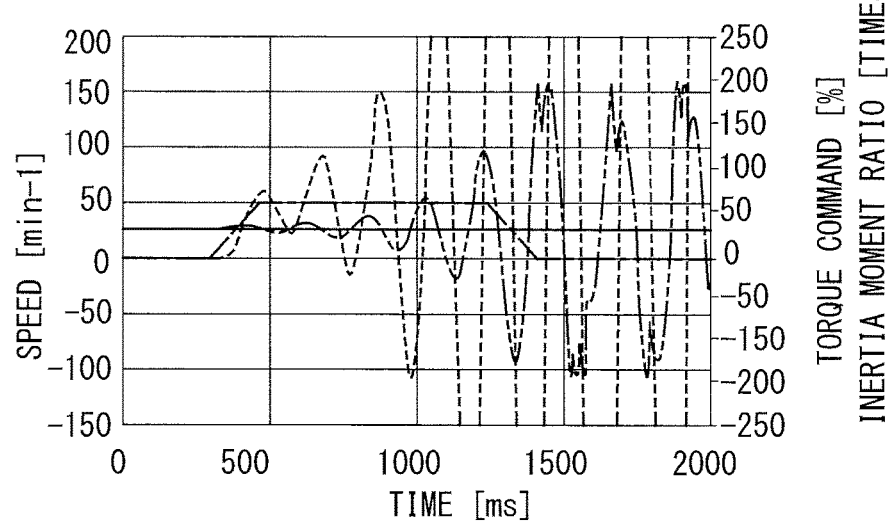
FIG. 26B is a graph of results (load: 28-times rigid load, control: position control, mode: output correction disable mode) of experimental evaluation according to a comparative example in which the motor control device is not provided with the inertial load value calculator.

FIG. 26A is a graph of results of experimental evaluation on the adaptive observer for the inertial load value calculator 270. The motor control device 200 is approximately equal in configuration to the motor control device 100 in the output correction disable mode. Therefore, enlarging the horizontal axis of the graph of FIG. 21A results in the graph of FIG. 26A. FIG. 26B is a graph of results of experimental evaluation in cases where the motor control device 200 is not provided with the inertial load value calculator 270.

As shown in FIG. 26A, the motor control device 200 provided with the inertial load value calculator 270 achieves estimation of a true value of an inertia moment at about 800 ms, so that motor control becomes stable in a relatively short time. As shown in FIG. 26B, on the other hand, the motor control device 200 not provided with the inertial load value calculator 270 causes divergent vibrations, so that the motor control becomes unstable.

As described above, the output command calculator 260 employs the estimated inertial load value $J_E$ as the inertial load value $J_0$. This configuration therefore simplifies calculation processing using the estimated inertial load value $J_E$. This configuration thus enhances stability in motor control and improves the processing speed of the motor control device 200.

Modifications (1) In the first and second embodiments, the motor control devices 100 and 200 each perform the position control. The technologies disclosed in the foregoing embodiments are also applicable to speed control.

(2) In the first and second embodiments, the motor control devices 100 and 200 each control the motor 4 which is a rotary motor. The technologies disclosed in the foregoing embodiments are also applicable to a linear motor and other motors each serving as the motor 4. In cases where the motor 4 is a linear motor, the movable member 4B includes a slider movable linearly relative to the base member 4A. The motor output sensor 9 includes a linear encoder to detect a position, on a straight line, of the movable member 4B relative to the base member 4A. In cases where the motor 4 is a linear motor, the output command T includes a thrust command, the motor output command Tr includes a motor thrust command, and the output correction value Tc includes a thrust correction value. In cases where the motor 4 is a linear motor, moreover, the inertial load value $J_0$ includes an inertial mass. Since the inertial load value $J_0$ includes the inertial mass, this configuration enhances follow-up performance in linear-drive motor control.

The description of each of the first and second embodiments is applicable to a linear motor by respectively changing terms "inertia moment" and "torque" used in a rotary-drive system into the terms "inertial mass" and "thrust" used in a linear-drive system. Therefore, details in cases of controlling the linear motor will not be described here.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The configurations of the embodiments can include at least one of hardware configured to perform specific functions and software programmed to perform specific functions. Namely, the configurations configured to perform the specific functions are realized by hardware, software, and/or combination thereof.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

Obviously, numerous modifications and variations of the present invention are possible in light of the above teachings. It is therefore to be understood that within the scope of the appended claims, the invention may be practiced otherwise than as specifically described herein.

What is claimed is:

1. A motor control device comprising:
   output command calculation circuitry configured to calculate a motor output command, based on a motor acceleration command and an inertial load value indicative of a magnitude of inertia of a load on a motor; and
   inertial load value calculation circuitry configured to calculate an estimated inertial load value with an adaptive observer, based on the motor output command and a motor actual output to be output from the motor, and configured to calculate the inertial load value, based on the estimated inertial load value, the inertial load value calculation circuitry comprising:
      first state amount calculation circuitry configured to calculate a first state amount, based on a state setting and the motor actual output;
      second state amount calculation circuitry configured to calculate a second state amount, based on the state setting and the motor output command; and
      adaptive identification calculation circuitry configured to calculate the estimated inertial load value, based on the first state amount and the second state amount.

2. The motor control device according to claim 1, further comprising
   output correction value calculation circuitry configured to calculate an output correction value, based on the motor actual output and the motor output command, wherein
   the output command calculation circuitry comprises:
      first output command calculation circuitry configured to calculate an output command, based on the motor acceleration command and the inertial load value; and
      second output command calculation circuitry configured to calculate the motor output command, based on the output command and the output correction value.

3. The motor control device according to claim 2, wherein the output correction value calculation circuitry is configured to estimate a disturbance of the motor to calculate the output correction value.

4. The motor control device according to claim 1, wherein the inertial load value calculation circuitry comprises
   inertial load value change circuitry configured to change the inertial load value, based on the estimated inertial load value.

5. The motor control device according to claim 4, wherein the inertial load value change circuitry is configured to change the inertial load value, based on a reference inertial load range and the estimated inertial load value.

6. The motor control device according to claim 5, wherein
the inertial load value change circuitry is configured to
calculate, as an estimated inertial load ratio, a ratio of
a target inertial load value obtained by subtracting the
reference inertial load value from the estimated inertial
load value to a reference inertial load value indicative
of a magnitude of inertia of a movable member in the
motor, and
the inertial load value change circuitry is configured to
increase the inertial load value when the estimated
inertial load ratio is larger than an upper limit value of
the reference inertial load range.

7. The motor control device according to claim 6, wherein
the inertial load value change circuitry is configured to
increase the inertial load value with the estimated
inertial load value when the estimated inertial load ratio
is larger than the upper limit value of the reference
inertial load range.

8. The motor control device according to claim 5, wherein
the inertial load value change circuitry is configured to
calculate, as an estimated inertial load ratio, a ratio of
a target inertial load value obtained by subtracting the
reference inertial load value from the estimated inertial
load value to a reference inertial load value indicative
of a magnitude of inertia of a movable member in the
motor, and
the inertial load value change circuitry is configured to
decrease the inertial load value when the estimated
inertial load ratio is smaller than a lower limit value of
the reference inertial load range.

9. The motor control device according to claim 8, wherein
the inertial load value change circuitry is configured to
decrease the inertial load value with the estimated
inertial load value when the estimated inertial load ratio
is smaller than the lower limit value of the reference
inertial load range.

10. The motor control device according to claim 1, wherein
the inertial load value calculation circuitry is configured
to calculate the inertial load value by outputting the
estimated inertial load value as the inertial load value to
the output command calculation circuitry.

11. The motor control device according to claim 1, wherein
the inertial load value calculation circuitry is configured
to calculate the estimated inertial load value with the
adaptive observer, based on the motor actual output and
the motor output command, without directly using the
motor acceleration command and a command upstream
from the motor acceleration command.

12. The motor control device according to claim 1, wherein
the inertial load value includes an inertia moment.

13. The motor control device according to claim 1, wherein
the inertial load value includes an inertial mass.

14. A method of controlling a motor, comprising:
calculating a motor output command by output command
calculation circuitry, based on a motor acceleration
command and an inertial load value indicative of a
magnitude of inertia of a load on a motor;
calculating an estimated inertial load value by an inertial
load value calculation circuitry with an adaptive
observer, based on the motor output command and a
motor actual output to be output from the motor, the
calculating of the estimated inertial load value comprising:
calculating a first state amount by first state amount
calculation circuitry of the inertial load value calculation circuitry, based on a state setting and the motor
actual output;
calculating a second state amount by second state
amount calculation circuitry of the inertial load value
calculation circuitry, based on the state setting and
the motor output command; and
calculating the estimated inertial load value by adaptive
identification calculation circuitry of the inertial load
value calculation circuitry, based on the first state
amount and the second state amount; and
calculating the inertial load value by the inertial load
value calculation circuitry, based on the estimated
inertial load value.

15. The motor control method according to claim 14, further comprising
calculating an output correction value by output correction value calculation circuitry, based on the motor
actual output and the motor output command, wherein
the calculating of the motor output command comprises:
calculating an output command by the output command
calculation circuitry, based on the motor acceleration
command and the inertial load value; and
calculating the motor output command by the output
command calculation circuitry, based on the output
command and the output correction value.

16. The motor control method according to claim 15, wherein
the calculating of the output correction value includes
estimating a disturbance of the motor to calculate the
output correction value.

17. The motor control method according to claim 14, wherein
the calculating of the estimated inertial load value
includes outputting the estimated inertial load value as
the inertial load value to the output command calculation circuitry to calculate the inertial load value.

* * * * *